(12) United States Patent
Venton-Walters

(10) Patent No.: US 8,376,077 B2
(45) Date of Patent: Feb. 19, 2013

(54) MODULAR METAMORPHIC VEHICLE

(75) Inventor: Roy Venton-Walters, Neshkoro, WI (US)

(73) Assignee: Oshkosh Corporation, Oshkosh, WI (US)

(*) Notice: Subject to any disclaimer, the term of this patent is extended or adjusted under 35 U.S.C. 154(b) by 702 days.

(21) Appl. No.: 12/377,846

(22) PCT Filed: Oct. 6, 2006

(86) PCT No.: PCT/US2006/039254
§ 371 (c)(1),
(2), (4) Date: Jan. 14, 2011

(87) PCT Pub. No.: WO2008/020861
PCT Pub. Date: Feb. 21, 2008

(65) Prior Publication Data
US 2011/0114409 A1    May 19, 2011

Related U.S. Application Data

(63) Continuation-in-part of application No. PCT/US2006/032356, filed on Aug. 18, 2006.

(60) Provisional application No. 60/709,615, filed on Aug. 19, 2005.

(51) Int. Cl.
 B60G 17/00  (2006.01)
 B62D 49/06  (2006.01)
 B62D 61/10  (2006.01)
 B60B 35/10  (2006.01)

(52) U.S. Cl. ....... 180/209; 180/252; 180/24; 180/24.02; 180/24.07; 180/8.2; 280/43; 280/6.156; 280/6.157

(58) Field of Classification Search .............. 180/209, 180/252, 253, 22–24, 24.02, 24.07, 340, 180/9.48, 9.5, 9.52, 9.54, 41, 8.1, 8.2, 8.3; 280/43, 43.15, 43.16, 43.17, 6.15, 6.154–6.157
See application file for complete search history.

(56) References Cited

U.S. PATENT DOCUMENTS

| | | |
|---|---|---|
| 3,306,390 A | 2/1967 | Jamme |
| 4,241,803 A | 12/1980 | Lauber |
| 4,395,191 A | 7/1983 | Kaiser |
| 4,558,758 A | 12/1985 | Littman et al. |
| 5,137,101 A | 8/1992 | Schaeff |
| 6,036,201 A | 3/2000 | Pond et al. |
| 6,311,795 B1 | 11/2001 | Skotnikov et al. |

(Continued)

FOREIGN PATENT DOCUMENTS

| | | |
|---|---|---|
| EP | 1 502 843 A2 | 2/2005 |
| EP | 1 580 100 A2 | 9/2005 |

(Continued)

OTHER PUBLICATIONS

International Search Report and Written Opinion for International Application No. PCT/US06/32356, mailing date of International Search Report Apr. 21, 2008 (6 pgs.).

(Continued)

Primary Examiner — Ruth Ilan
(74) Attorney, Agent, or Firm — Foley & Lardner LLP

(57) ABSTRACT

A vehicle (10) comprising a vehicle body, a suspension system coupled to the vehicle body, and a plurality of wheels (16) coupled to the suspension system comprising at least one pair of wheels, each wheel of the at least one pair of wheels being located on opposite sides of the vehicle. The suspension system comprises a changeable wheel track width for the at least one pair of wheels and the wheel track width is changeable between a narrow wheel track width setting (12) and a wide wheel track width setting (14) by pivoting a suspension link (18) about a vertical axis.

27 Claims, 12 Drawing Sheets

U.S. PATENT DOCUMENTS

| | | |
|---|---|---|
| 6,443,687 B1 | 9/2002 | Kaiser |
| 6,899,191 B1 | 5/2005 | Lykken |
| 7,198,278 B2 | 4/2007 | Donaldson |
| 2003/0001346 A1 | 1/2003 | Hamilton et al. |
| 2008/0284118 A1 | 11/2008 | Venton-Walters et al. |

FOREIGN PATENT DOCUMENTS

| | | |
|---|---|---|
| FR | 2 704 500 A1 | 11/1994 |
| FR | 2 844 245 A1 | 3/2004 |
| GB | 2 402 658 B | 12/2004 |
| WO | WO 2005/056308 | 6/2005 |
| WO | WO 2005/056308 A1 | 6/2005 |
| WO | WO 2007/097779 A2 | 8/2007 |

OTHER PUBLICATIONS

International Search Report and Written Opinion for International Application No. PCT/US06/39254, mailing date of International Search Report Nov. 12, 2007 (11 pgs.).

Office Action for European Patent Application No. 06 850 516.3, dated Feb. 12, 2010, 3 pages.

MODULAR METAMORPHIC VEHICLE

CROSS-REFERENCE TO RELATED PATENT APPLICATIONS

This Application is a Continuation-In-Part of International Application PCT/US2006/032356, filed Aug. 18, 2006, which claims the benefit of U.S. Provisional Application No. 60/709,615, filed Aug. 19, 2005, the content of both are incorporated herein by this reference in their entirety.

BACKGROUND

The present invention relates to vehicles incorporating computer controlled suspension operation, electrically driven wheels, and configurations for amphibious operation. In particular, the present invention relates to rapid deployment vehicles, such as military vehicles. The present invention also relates to non-military vehicles (e.g., civilian vehicles, SUVs, aircraft recovery vehicles, fire fighting vehicles, agricultural vehicles, forestry vehicles, etc.).

In its battlefield or support role, a modern military vehicle is often expected to have high level of mobility (e.g., the ability to rapidly traverse a wide range of difficult terrain). In many cases, battles are won or lost on the effectiveness of military vehicle mobility in both fighting vehicles and associated logistics vehicles.

There are many conventional design requirements needed to achieve a given level of vehicle mobility. Substantially comprehensive mobility analysis can be conducted (e.g., during the design phases of the vehicle) by computer programs such as the NATO Reference Mobility Model (NRMM) and dynamic modeling software (e.g., DADS, ADAMS, etc.). Despite these types of programs, the actual mobility levels of wheeled military vehicles in service around the world have not increased dramatically for many years.

In recent years, there have been many changes in the world that have influenced both the nature of the battlefront and the needs of military forces. Various recognized logistical problems in the rapid deployment of heavily armored vehicles such as tanks overseas have had an impact on the traditional heavy armored approach to battle warfare, sometimes in favor of lighter, air-transportable vehicles. For this type of approach, it is useful to have vehicles that are difficult for an enemy to locate and that incorporate high levels of stealth (e.g., the capability to deny the enemy the ability to locate or target a vehicle).

The availability of a portfolio of stealth measures along with advances in communication, information technologies, and smart remotely deployable armor-piercing weaponry brings into focus the possibility of fielding a hidden stealth force (e.g., a disseminated force of smart-weapons-equipped, highly mobile stealth vehicles, capable of outrunning, out-maneuvering and destroying a tank force). A stealth force is useful because it is air transportable and deployable. The stealth force is deployable almost anywhere in the world within hours, rather than the weeks or months often needed for the deployment of some conventional tank forces. However, in order to perform their functions from a distance, it is advantageous for these more lightly armored wheeled vehicles and their supply lines to have the capacity to outrun and out-maneuver contemporary battlefield vehicles.

The differences in the nature of the mobility of tracked versus wheeled vehicles is a consideration when determining features of a stealth force. For example, a tank can force its way through fairly dense vegetation and/or covered terrain that may be inaccessible to lighter wheeled vehicles. Accordingly, in order to meet the objectives of remote stealth operations, it is advantageous to improve mobility over rough terrain as well as dense and covered terrain.

The advent of new "enabling technologies" such as active suspension, drive by wire or light (DWL), advanced lightweight materials, new drive systems, etc. may not, by themselves, be sufficient to achieve the desired level of mobility in future rapid deployment stealth vehicles. This is because of the limitations imposed by transportability considerations. For example, despite these technologies, it is still necessary to transport a vehicle to its place of deployment. This dictates many aspects of the vehicle's design, and can inhibit many desirable attributes needed for mobility.

In many cases, transportation may be done under the vehicle's own locomotion along normal highways, or more commonly by rail, sea-born or aerial transport (e.g., C130 limits). Accordingly, the criteria for highway operation is similar to civilian vehicles—the vehicle should conform to maximum individual axle and gross vehicle weight loadings appropriate for the highway systems and bridge structures it may be driven over. Overall height should be such that it can safely pass under bridges and through road tunnels etc., while its maximum length, width and turning circle should be appropriate for the road systems over which it may be used. Effectively, this means that a military vehicle, in some instances, should conform as much as possible to highway regulations, not only in its country of origin, but in all countries that it may be used.

In addition, rail and sea transportation can impose dimensional conditions on military vehicle design, with rail-tunnel clearance imposing strict width and height disciplines, which vary from continent to continent. Ships, especially roll-on/roll-off ferries, can also define allowable heights and widths.

For rapid deployment military vehicles, an important transportation capability is air transport. However, air transportation by heavy transport aircraft imposes not only dimensional constraints on height, width and length, but also places limits on overall weight, individual axle weights, and also defines, how the axles share the load during the loading/unloading operation. Air transport by helicopter is oftentimes weight dependent. The vehicle should be within the allowable lift capacity of the helicopter to be transported (a lesser weight extending the lift range and ceiling height limits). Because getting the vehicle to its place of deployment is in most cases a pre-condition to deployment itself, compliance with each of the forgoing criteria will normally limit the potential design of the vehicle for its battlefield or support role.

Achieving the necessary length of vertical suspension travel in jounce and rebound for certain levels of mobility is useful in designing fast, highly mobile, off-road wheeled vehicles. The practical advantages of long suspension travel for high-speed operation over rough terrain have been demonstrated by vehicles competing in competitive off-road racing events, where suspension travel as great as 30 inches full jounce to full rebound is sometimes utilized.

Specially designed tires are often used for off-road operation in conventional systems and vehicles. The tire size can effect off-road mobility. Larger diameter tires are typically better for off-road situations except under certain circumstances such as when the mass of the tire itself becomes the limiting factor by reason of inertial and hysteresis effects. With current tire technology and vehicle operating speeds, the practical advantages associated with increased tire size are oftentimes not lost until the diameter reaches about 60 inches or more.

The maximum allowable tire diameter is typically considered together with the maximum allowable suspension jounce travel, another parameter which can effect vehicle off-road mobility. The limit of allowable rear suspension vertical or jounce travel is set by the bottom or support structure of the containerized load. The height position is set by the height of the top of the container and the under-bridge clearance requirements. A compromise is typically determined using computer simulations of vehicle operation over the desired terrains in the appropriate weather conditions.

In addition to compromises between wheel diameter and suspension jounce travel due to the maximum permissible overall height of the vehicle, a similar limitation can also apply to other types of military vehicles having a lower overall height. For example, the center of gravity of a vehicle can be a limitation. At a maximum permitted off-road payload, increasing the rear suspension jounce by raising the vehicle's cargo-bed may improve mobility over some terrains, but may decrease mobility over other terrains by virtue of its increased propensity to roll-over due to the increased center of gravity height. Some military vehicles that meet the above-described transportability requirements provide a balanced compromise between a number of potentially conflicting parameters in order to realize the comparatively high level of mobility that has conventionally been needed. This has been accomplished at least in part due to the experiences of operation influencing vehicle design as well as the ability to simulate vehicle dynamic behavior using computer modeling. Despite these compromises, mobility can still be improved.

The successful achievement of long suspension travel is not oftentimes straightforward, even on vehicles where the primary function is dedicated to off-road racing. The design compromises typically made to the length of suspension travel for vehicles that require a high level of off-road mobility, but whose function also incorporates design features for meeting a range of additional requirements, can be challenging. Such vehicles include SUVs and pick-up trucks, which additionally need to meet the practical and legislative requirements of highway operation, as well as wheeled military vehicles that also meet a variety of additional specialist functions.

If enough clearance is provided with conventional vehicles to permit the use of wheels and tires large enough and suspension vertical travel long enough to give the needed high levels of mobility, for example, by moving the wheels laterally outwards beyond the body width of the vehicle to achieve the necessary space, there still are a number of other potential problems that are to be addressed. One such problem relates to the types of suspension linkages suitable for the application and that can support a long vertical suspension travel (e.g., perhaps as great as one wheel diameter of about 50 inches).

There are various advantages and disadvantages of conventional double A-arm, or lateral control arm, independent suspension for off-road operation. Because the suspension system pivotal axes are essentially in line with the vehicle's longitudinal axis (depending on the detail of design) there is often little, if any, sensitivity to wheel torque reaction. That is, if braking or drive torque were to be reacted into the outboard ends of the control arms this, in itself, would not result in the generation of significant spurious vertical forces causing the vehicle's sprung mass to be raised or lowered at that axle position. However, the effective roll center of a double A-arm suspension is quite low, sometimes below ground surface level, so the vertical moment distance to the vehicle's sprung mass center of gravity is greater than for other suspension systems, resulting in a propensity to body roll when reacting to lateral forces such as in cornering or side slope operation. Further, the limited length of the A-arms, which "eat" into the useable chassis or body width, can limit the suspension travel.

Accordingly, such systems are often not good. candidates for use where long suspension travel is required. Solid axles, which are commonly used on medium and heavy trucks, and which comprise a single axle housing an integral differential and spanning the inside width between wheel pairs, are typically limited with respect to vertical jounce travel by potential contact with the vehicle's chassis rails or underside of the cargo bed or power source.

Leading and trailing-arm suspension systems are relevant to the design of off-road vehicles because they can achieve the necessary length of wheel travel without "eating into" the width of the vehicle's hull or understructure as compared to more conventional lateral control arm suspension designs. Trailing or leading link suspensions are utilized for some off-road operation including tanks and other tracked vehicles. Tank tracks are typically sprocket-driven from a fixed (unsprung) axle-drive, while the leading and/or trailing arm support wheels, which bear the tank's weight along the track length, are not driven. In the case of a wheel-driven vehicle using trailing and/or leading-arm suspension, consideration is given to containment or elimination of both the effects of drive and brake torque reactions, as well as moments generated about the suspension pivotal axes by the longitudinal drive thrust and braking forces. Such reactions are capable of generating spurious vertical force components, which may be detrimental to suitable operation of the suspension system, especially with respect to Near Constant Force (NCF) springing.

For highway operation where the extent of vertical suspension travel is generally modest in comparison to off-road needs, problems can occur when driven axles are combined with leading or, more commonly, trailing arm suspension systems. The generation of spurious vertical forces is sometimes pronounced when wheel torque and/or tractive force is high, such as for commercial trucks. The dynamic interaction between wheel torque reaction or tractive force and spurious force can be problematic, giving rise to wheel hop and transmission judder. In the case of the trucking industry, the phenomenon is often prevalent and is known as "frame rise." Frame rise is often attributed to the reaction of axle reaction torque into the suspension trailing arms.

Axle torque reaction causes frame rise when the trailing arm is aligned with the vehicle's horizontal axis. When the trailing arm is at an angle $\theta$ to the truck's horizontal axis, a vertical force component $V_f = \tan(\theta) \times T_f$, where $T_f$ is the tractive force of the axle or wheel. Therefore, if a trailing arm were, for example, at a 45 degree downward inclination from the truck's horizontal axis, the magnitude of the spurious vertical force generated at the trailing arm's attachment to the truck's frame would equal the horizontal tractive thrust component at the same point to propel the truck. This can limit the application of leading and trailing arm linkages for long suspension travel applications.

The packaging space to achieve the desired length of suspension travel and wheel diameter as well as the type of suspension linkages used are not the only factors to be taken into consideration when analyzing vehicle mobility or total vehicle design for future wheeled military vehicle operation.

For mobility, there are a number of other design considerations, each of which, if not correctly addressed with the appropriate weighting in a balanced vehicle design, can limit a vehicle's mobility, despite good design practice in other areas. One way to identify these parameters and to quantify their influence over different types of terrain in various weather conditions is to study the NRMM source code and manuals, and/or to run NRMM simulations. Of course, as one skilled in the art would appreciate, other methods may also be used.

In addition to the wheel/tire diameter and length of vertical suspension travel already mentioned, some other exemplary vehicle related parameters include vehicle weight, individual wheel/axle load at the ground, number of wheels/axles, number of driven/braked wheels/axles, tire characteristics/tire pressures, available locomotive power, transmission characteristics and efficiencies, tractive force, underbody ground clearances, front pushbar strength and height, driver's forward view (vision height above ground), braking capability, vehicle/suspension dynamics, lateral stability, steering/maneuvering capability, fording/amphibious capability, etc.

In addition to mobility related features and the ability to be transportable by road, rail air and sea, there are a number of other desirable features that future highly mobile response vehicles may incorporate. For example, lightweight construction is a desirable feature for the transportation of rapid deployment vehicles by C130 transport aircraft and/or for helicopter lift. It is also a beneficial feature for mobility and for vehicle fuel efficiency.

Physical aspects which, when advantageously addressed, are likely to provide a lighter vehicle weight include designs allowing stresses to pass through outermost fibers, maximized separation of outermost fibers, use of shape and shaping advantageously, triangulations rather than cantilevers, use of lightweight materials, use of containers, flatracks or cargo beds as stressed parts of the structure, use of armor/landmine protection as stressed parts of the structure, identification and use of light reliable discrete components, avoidance of stress raisers or fatigue prone jointing methods, and avoidance of both weight and cost by eliminating unnecessary components. In order to deny an enemy the ability to readily target the vehicle, visual, radar, thermal, and acoustic signatures may be minimized. In addition, it may be desirable for the vehicle to be able to "kneel down" by reducing its suspension height, such that it can align its cargo deck with the cargo deck of a C130 or other transport aircraft to facilitate fast unloading and loading of containerized and flatrack mounted cargos.

It is desirable for the vehicle to protect its occupants and critical systems against Nuclear, Biological and Chemical (NBC) weapons attack as well as Electro-Magnetic Pulse effects. EMP hardening is one aspect of design that is desirable for stealth, operation. This is because any EMP vulnerability is the one way that an enemy may be able to collectively neutralize an entire vehicular force without first having to precisely locate them. EMP weapons include nuclear devices but also a range of possible advanced electromagnetic weapons as well as so called E-bombs such as Flux Compression Generators (FCGs) which use conventional explosive and electrical systems, and which have the potential to be manufactured with limited technical capability. It is desirable for the vehicle and its discrete electronic and communication systems to be protected from Electro-Magnetic Interference (EMI), whether from external sources or its own internal systems or on-board weapons such as directed energy weapons. In addition, it is desirable for the vehicle to be able to protect its occupants and critical systems against light weapons fire and mine blast. It is also desirable for the vehicle to be able to ford a significant depth of water (typically 60 inches).

In view of the foregoing, it would be desirable to provide a highly mobile and maneuverable vehicle incorporating a leading or trailing arm suspension system compensated against torque and spurious vertical force reactions, and which could adapt its wheel-track, suspension geometry, and cab height from its on-road, air, rail, or sea transportability modes to a wide track and long suspension travel configuration. This would allow the wheels to move up past the vehicle's sides in order to overcome the limitation of suspension movement caused by the presence of the body or cargo-bed. It would be desirable to provide a system having long off-road suspension with movements of up to about 50 inches or more, thereby enabling reduced vertical accelerations on the vehicle, occupants and cargo, while traversing severe terrain at high speeds difficult for vehicles with conventional shorter travel suspension systems.

It would further be desirable to provide a vehicle that has the ability to be lowered between laterally extended wheels when needed. This configuration is advantageous for several reasons including a reduction in detectability and vulnerability to attack, the lowering of the center of gravity for improved stability, the grounding of the vehicle to allow heavy recoil weapons, the ability for personnel carried within an armored personnel carrier module to embark and disembark close to ground level, the ability to reduce cargo bed height to align exactly with transport aircraft decks, and readily permit fast, automated cargo transfer to and from an aircraft.

It would further be desirable to provide a vehicle having the capability to lift one or more wheels from the ground to minimize tire drag and/or improve fuel efficiency when carrying less than a full payload and/or to allow the vehicle to proceed in the event that a wheel or tire suffers damage. It would also be desirable if the operation of the vertical height and vertical movement of one or more wheels is manipulated as needed to cross obstacles such as steps, walls or trenches. It would further be desirable to configure the vehicle so that the wheel drive torque of the vehicle could be varied from one side to the other as required in order to effect differential torque steering or "skid steer" to steer the vehicle or to augment conventional or Drive by Wire or light (DWL) steering.

It would further be desirable to provide a vehicle that incorporates DWL technology having electrically driven wheels, and/or be of modular "plug and play" construction permitting multiple vehicle configurations for varied purposes to be assembled from a limited range of common modules, with the reconfiguration of module function primarily by software changes to the vehicle's management and/or control protocols. This enables combined driven, steerable and actively suspended axle modules complete with central tire inflation (CTI) systems to be integrated with cargo supporting and handling modules, power source and cooling modules, cab modules etc., and arranged in different vehicular layouts. For example, 4×4, 6×6, 8×8, 10×10 and/or other vehicle configurations may be built as needed, or even reconfigured by the end user according to future needs as they arise. Additionally, such high-level modularity provides a convenient means to break a larger (8×8 or 10×10) vehicle down into multiple segments for helicopter lift purposes.

It is preferable for the same plug and play modularity and protocols to be used for powered and unpowered trailers, articulated vehicles, autonomously operated vehicles and "mobility platforms" useable for a variety of vehicles including both logistics, scouting and fighting vehicles.

Modularity results in a benefit of achieving commonality and interchangeability of components and modular parts across a fleet. Not only does it reduce the number of replacement parts, either carried on the mission or available for air-drop, it improves the sacrificial value of any immobilized vehicles while serving to reduce the cost of manufacture by virtue of economy of scale. Further, it serves to reduce the level of personnel training, tools required, and costs to service and maintain a fleet.

It would further be desirable to provide a vehicle that incorporates the appropriate design and management of cooling flows, both ventilated (NBC contaminatable) for primary cooling, and refrigerated or conditioned for non-contaminatable areas such as for NBC protected personnel areas and areas housing equipment such as open electronic systems that are typically unsuited to normal decontamination procedures. It would also be desirable to provide a vehicle that is furnished with a suspension system of the Near Constant Force type so that rough terrain has minimal disturbance on the primary mass of the vehicle.

It would also be desirable to provide a suspension that is controlled by a device and/or system that actively controls the ride height and pitch and roll attitude, preferably deriving vehicle primary mass corrective forces from energy captured from the natural process of traversing the undulating terrain, rather than from extracting energy from the vehicle's power source and thus potentially degrading fuel efficiency.

It would also be desirable to provide the natural frequencies of the unsprung masses of the wheels, tires, and suspension systems to be dampened by a method which at least minimizes corrective forces between the unsprung masses and the vehicle primary mass, thereby reducing spurious force inputs into the primary mass while reducing suspension scanning and corrective frequencies.

It would be desirable to provide a vehicle that is furnished with a cab module that is readily demountable and interchangeable, and has the ability for the cab height to be adjustable in operation. It would be desirable to configure the vehicle cab to be mounted on the front of the vehicle on a height adjustable but common interface with other vehicles in a class. This enables cab types to be interchangeable without tools or forklift equipment, so that cabs may be provided and used in a number of different forms appropriate for the vehicle's intended usage.

There are several types and degrees of armor and mine-blast protection. Less armored cabs can be more spacious and can be furnished with more glass area to offer better general driver visibility at less cost. In addition, less armored cabs typically have a less intimidating appearance to the populous and can be used for domestic or non-hostile operations. Further, special purpose cabs may be provided for use with particular weapons or equipment modules, or for amphibious operation.

Having the cab set low for transportation purposes improves the reduction of visual and radar signatures. For high speeds over rough terrain, it is useful to mount a cab higher for improved forward visibility. For displacement amphibious operation the cab represents a buoyant element and the shaped forward portion of the vehicle's bow. Therefore, to improve buoyancy and lower hydrodynamic drag, the undersurfaces of the cab are aligned with the undersurfaces of the vehicle's main lower-hull. For planing amphibious operation, the design lower surfaces of the cab which form the bow of the vehicle can have a bearing on the vehicle's planing power requirement and wave height capability. Accordingly, it would be desirable to configure the undersurface of the cab to be aligned marginally below the undersurface of the main lower-hull to form a planing step.

In view of various problems discussed above, it would be desirable to provide a leading and/or trailing arm suspension linkage for driven axles of off-road vehicles, capable of large vertical displacement without generating significant spurious vertical forces as a result of vehicle tractive thrust. In addition, it would be desirable to provide a shorter suspension travel for highway vehicles.

In view of various problems discussed above, it would be desirable to provide a highly mobile and maneuverable vehicle which adapts its wheel-track, suspension geometry, and cab height from its on-road, air, rail, or sea transportability modes to a wide track and long suspension travel configuration to enable high speed mobility over difficult cross-country terrain. In addition, it would be desirable to provide a rapid deployment vehicle incorporating computer controlled suspension operation and electrically driven wheels, and/or those used for amphibious operation.

It would be advantageous to provide a system or the like of a type disclosed in the present application that provides any one or more of these or other advantageous features. The present invention further relates to various features and combinations of features shown and described in the disclosed embodiments. Other ways in which the objects and features of the disclosed embodiments are accomplished will be described in the following specification or will become apparent to those skilled in the art after they have read this specification. Such other ways are deemed to fall within the scope of the disclosed embodiments if they fall within the scope of the claims which follow.

SUMMARY

The present invention relates to a suspension system for a vehicle having a body, comprising a plurality of wheels couplable to the vehicle and comprising at least one pair of wheels, each wheel of the at least one pair of wheels positionable on opposite sides of the vehicle wherein at least one wheel is coupled to a motor, and a changeable wheel, track width for the at least one pair of wheels. The changeable wheel track width comprises at least a narrow wheel track width setting and a wide wheel track width setting and the wheel track width is changeable between the narrow wheel track width setting and the wide wheel track width setting by pivoting a suspension link about a vertical axis.

The present invention also relates to a vehicle, comprising a vehicle body, a suspension system coupled to the vehicle body, and a plurality of wheels coupled to the suspension system comprising at least one pair of wheels, each wheel of the at least one pair of wheels being located on opposite sides of the vehicle and at least one wheel is coupled to a motor. The suspension system comprises a changeable wheel track width for the at least one pair of wheels and the wheel track width is changeable between a narrow wheel track width setting and a wide wheel track width setting by pivoting a suspension link about a vertical axis.

The present invention further relates to a method of configuring a changeable wheel track width suspension system for a vehicle having a body. The method comprises providing a plurality of wheels coupled to the suspension system, the plurality of wheels comprising at least one pair of wheels, configuring each wheel of the at least one pair of wheels to be located on opposite sides of the vehicle, providing a changeable wheel track width for the at least one pair of wheels, wherein the changeable wheel track width is configured to comprise a narrow wheel track width setting and a wide wheel track width setting, and configuring the wheel track width to change width by pivoting of a suspension link about a vertical axis.

The present invention further relates to a system for correcting vertical forces in vehicle suspensions, comprising a suspension arm comprising a first end and a second end, a wheel attached at the first end of the arm by and assembly, and at least two links each comprising a first and second end having pivotable bearings at each end, the second ends of the at least two links coupled to the second end of the suspension arm. The first ends of the at least two links are configured to couple to a sprung mass of a vehicle and a locus of a center of the wheels is constrained to a substantially vertical linear path over a range of suspension travel.

DETAILED DESCRIPTION

Figure 1:
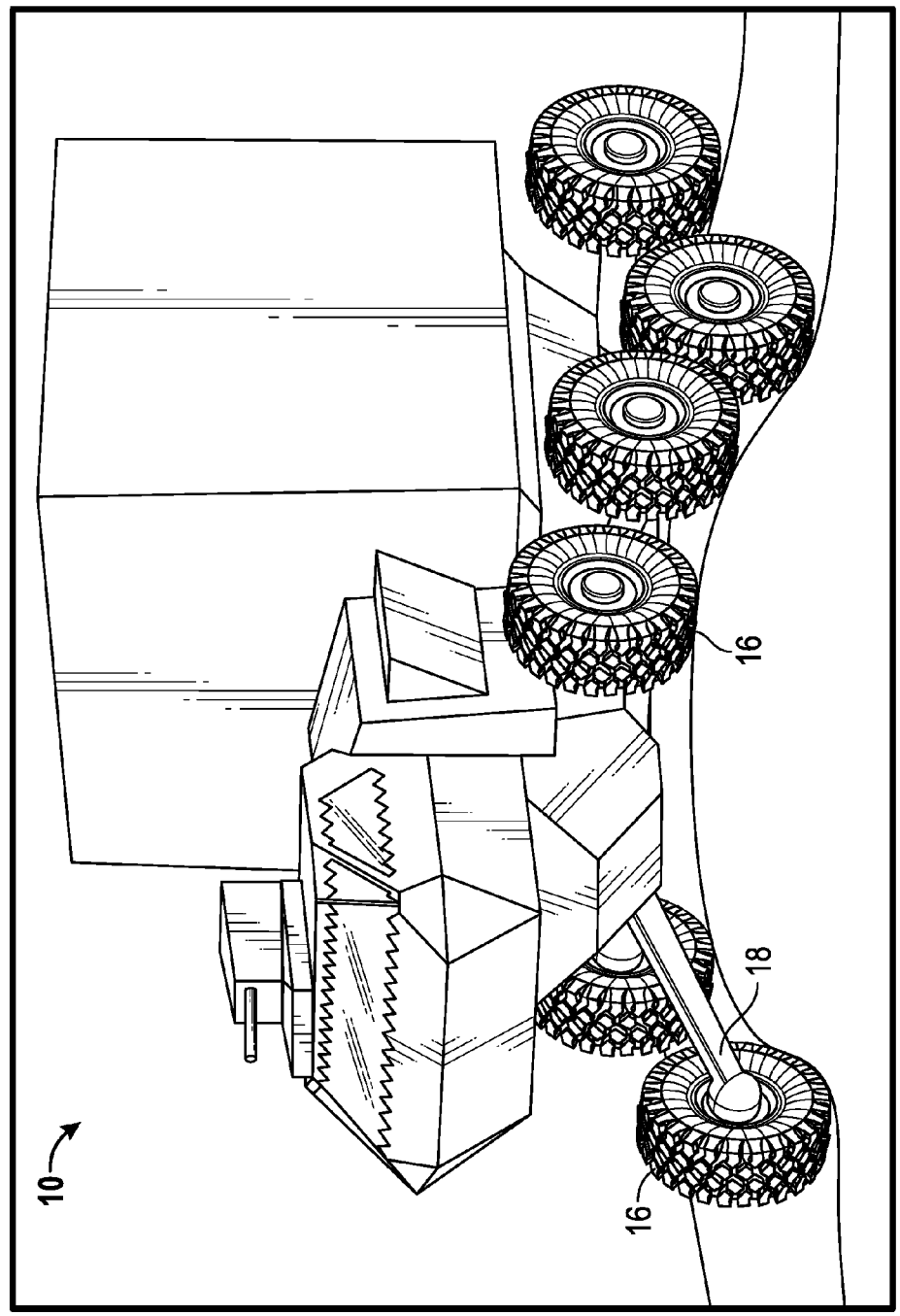
FIG. 1 is a front perspective view of a logistics vehicle with a container module and cab height and suspension track set for off-road terrain according to an exemplary embodiment.
Figure 2:
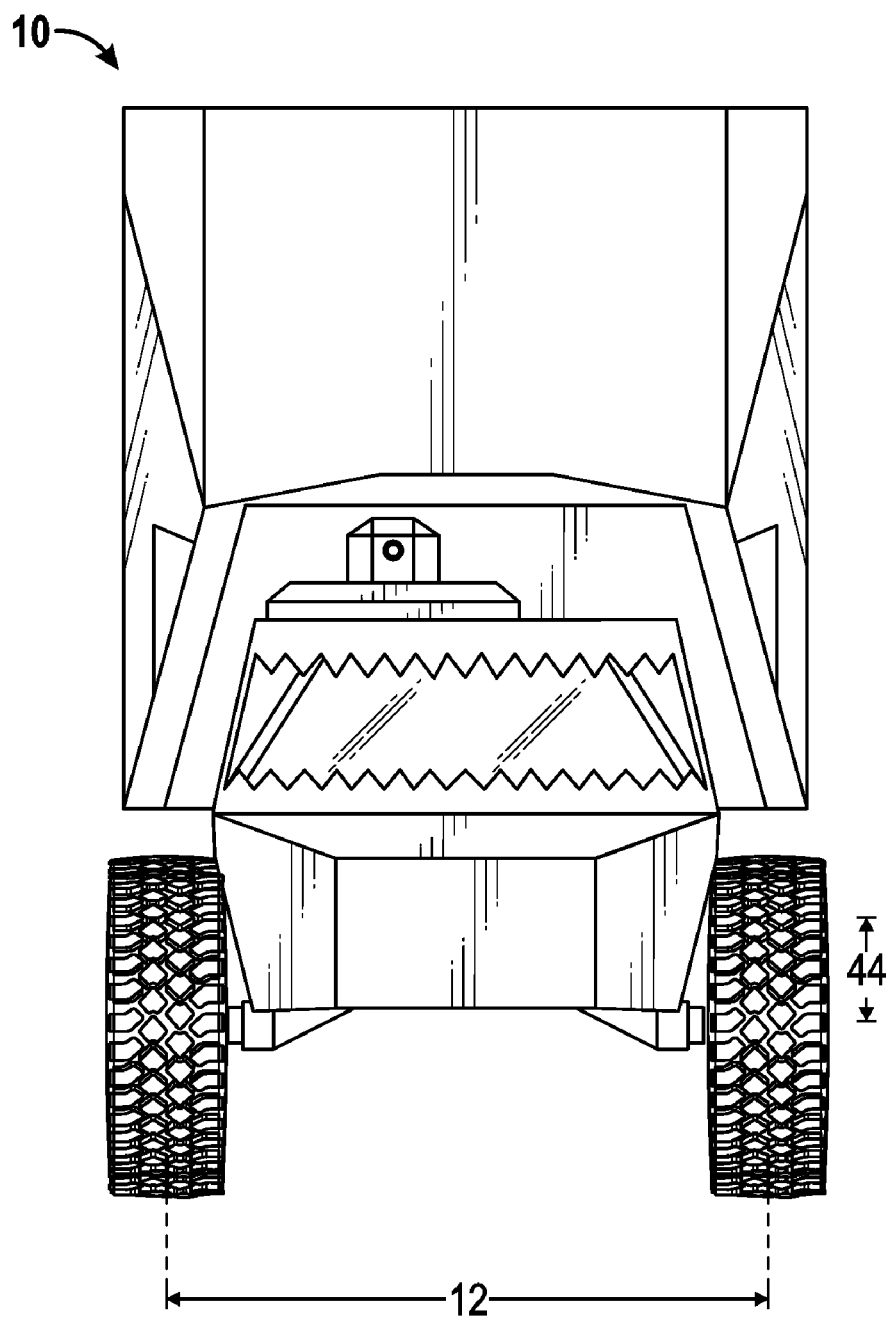
FIG. 2 is a front view of a logistics vehicle with wheel track and cab height set for highway operation according to an exemplary embodiment.
Figure 3:
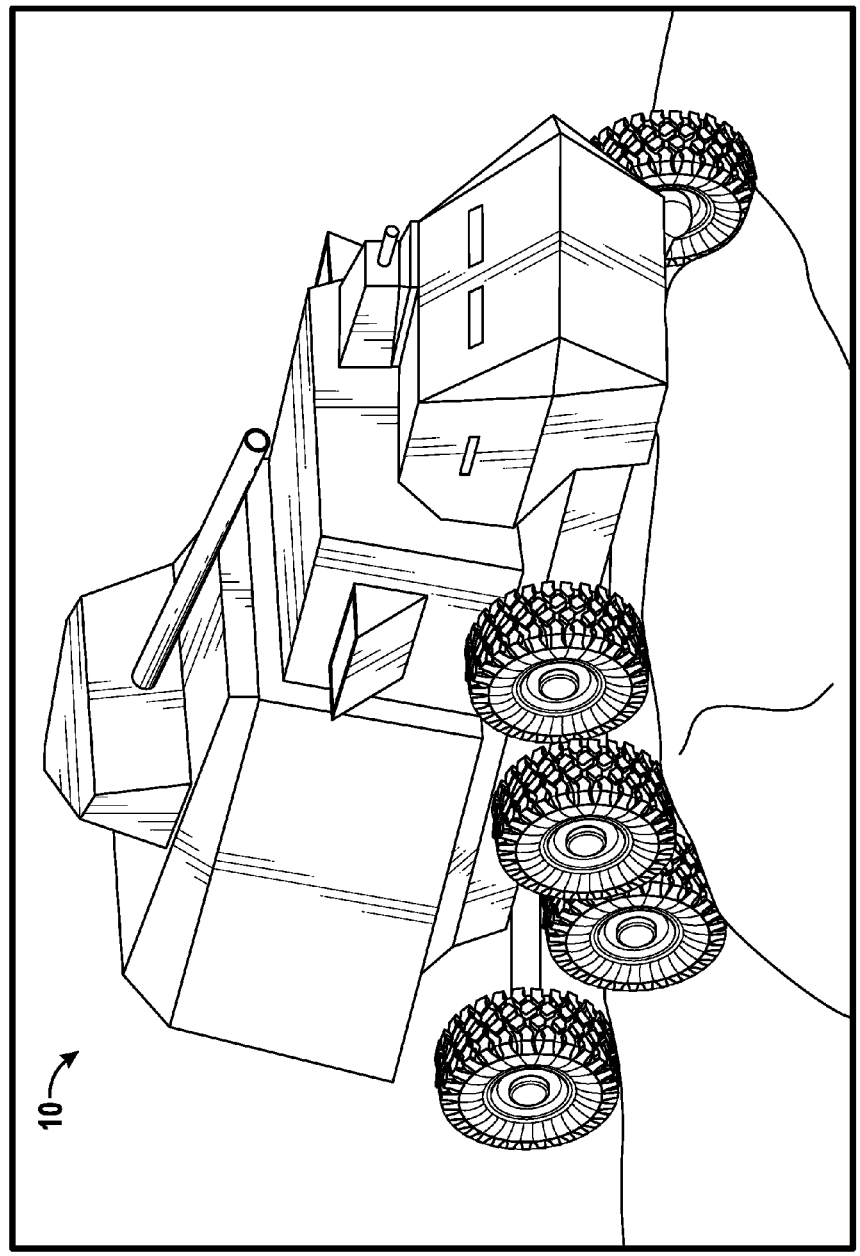
FIG. 3 is a front perspective view of an armored modular cab in a lowered position to allow forward weapon deployment and a weapons module on a common chassis according to an exemplary embodiment.
Figure 4:
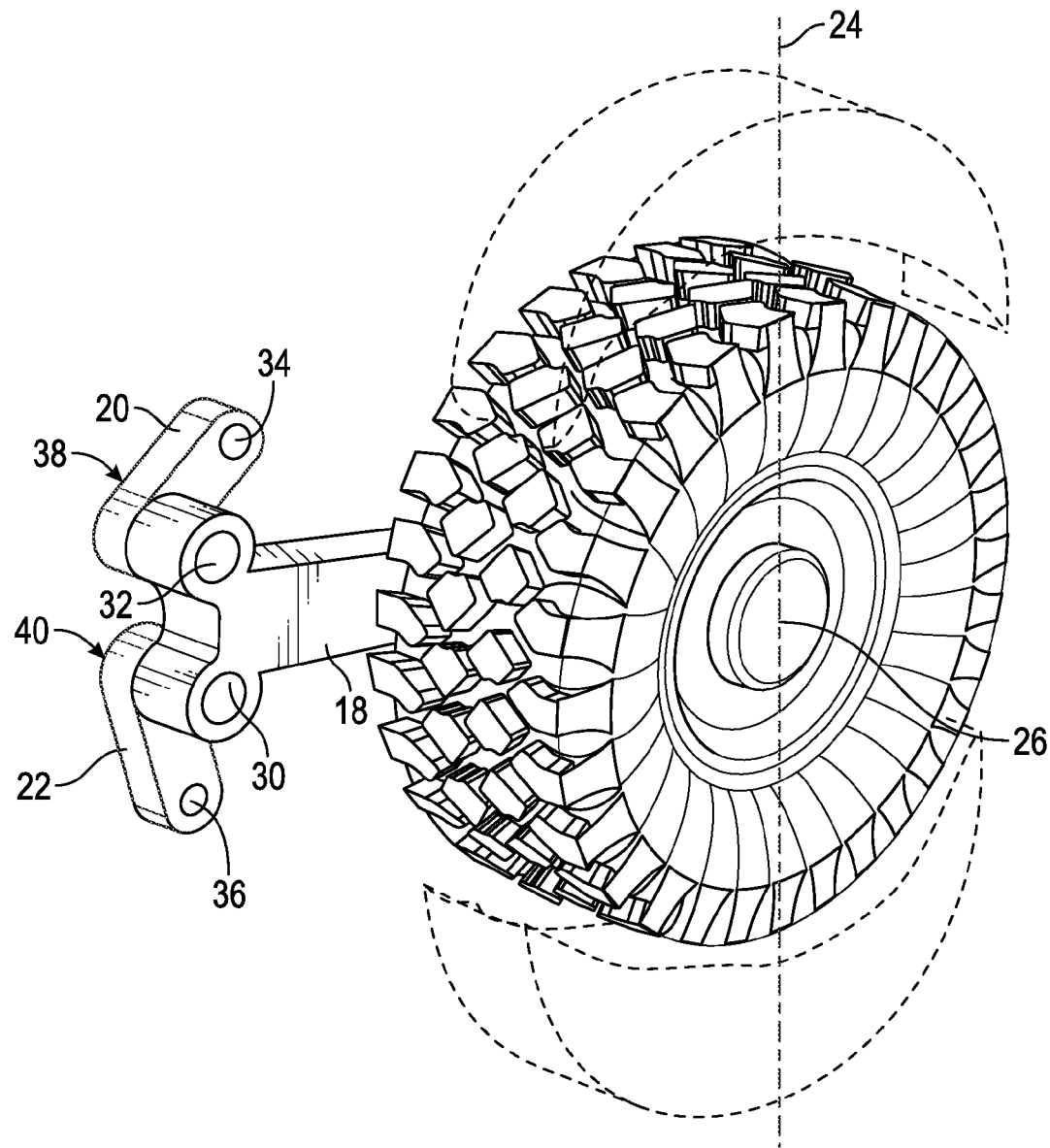
FIG. 4 is a front perspective view of a linkage and/or mechanism to correct spurious vertical forces in leading and trailing arm vehicle suspensions according to an exemplary embodiment.
Figure 5:
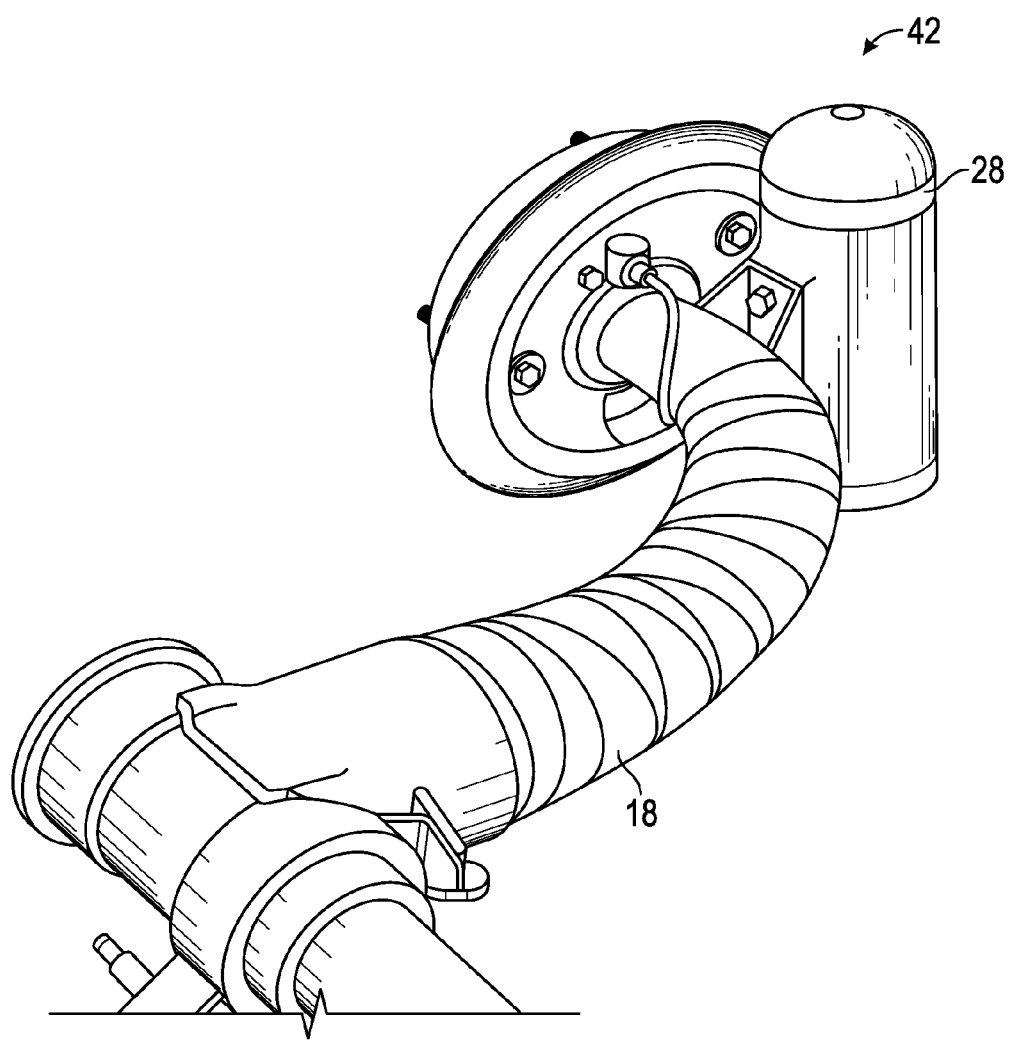
FIG. 5 is a front perspective view of a tuned mass damping system according to an exemplary embodiment.

Before explaining a number of exemplary embodiments of the invention in detail, it is to be understood that the invention is not limited to the details or methodology set forth in the following description or illustrated in the drawings. The invention is capable of other embodiments or being practiced or carried out in various ways. It is also to be understood that the phraseology and terminology employed herein is for the purpose of description and should not be regarded as limiting.

Figure 6:
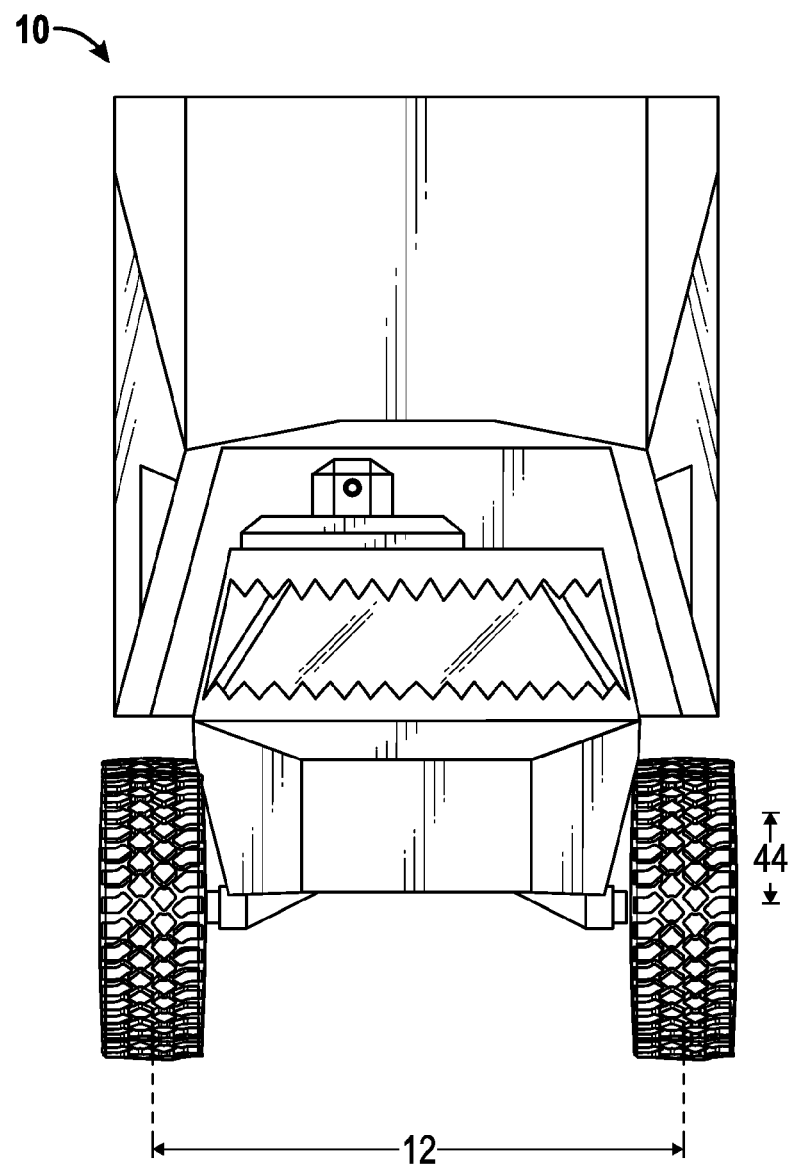
FIG. 6 is an illustration of an exemplary embodiment of a vehicle having a suspension system positioned in a narrow wheel track width.
Figure 7:
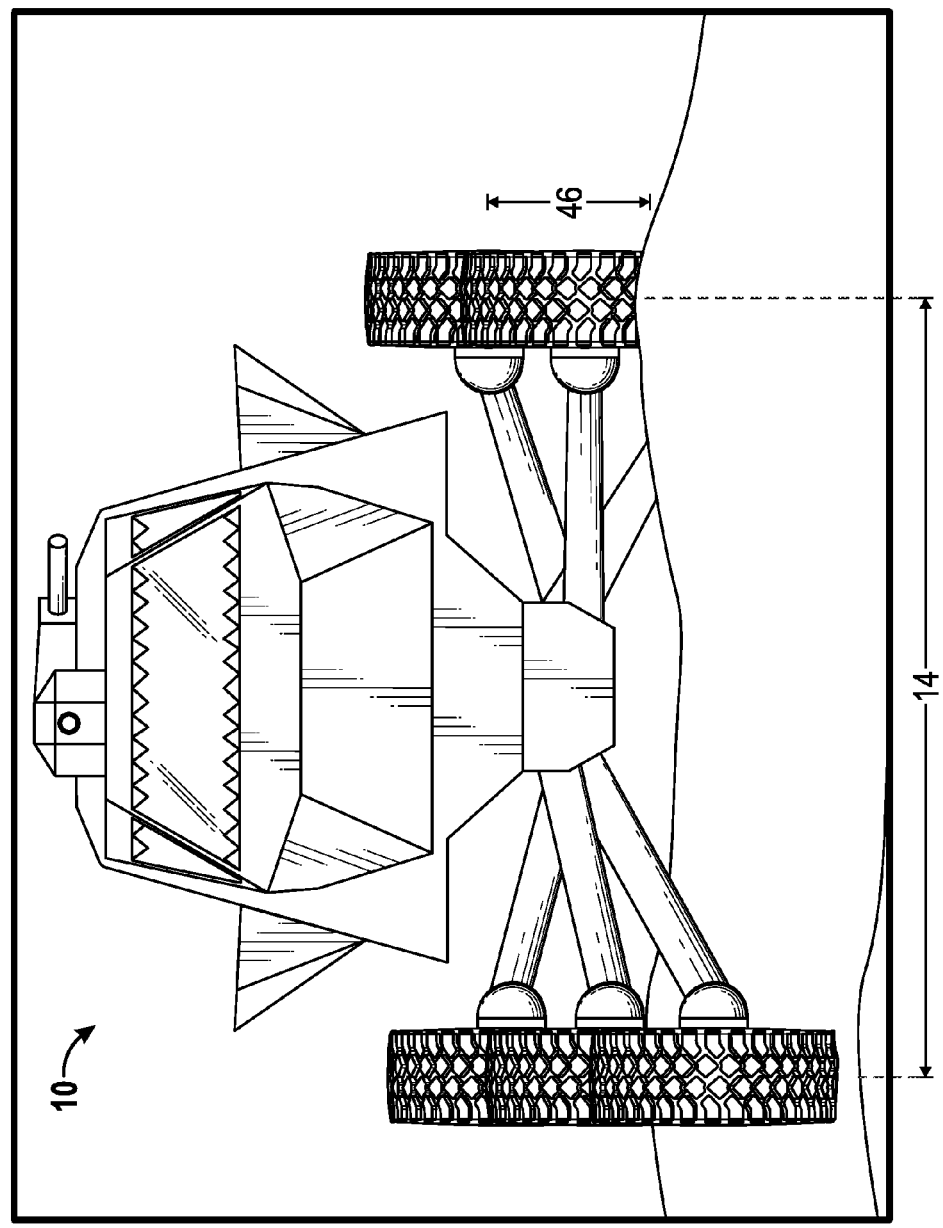
FIG. 7 is an illustration of an exemplary embodiment of a vehicle having a suspension system positioned in a wide wheel track width.

Referring to FIGS. 1-5, according to an exemplary embodiment, a vehicle 10 is provided that allows for changing the cab vertical position, the wheel-track width, and/or general suspension geometry. In highway operation and during transportation by air, rail or sea, vehicle 10 has a lowered cab, a standard (e.g., narrow) wheel track width 12 (see FIG. 6), and appropriate, fully operable suspension travel and steering. For rapid operation off-road over difficult cross-country terrain, the vehicle converts to a high cab and wide wheel track width 14 (e.g., such that its wheels are set outside its body) such as shown, for example, in FIG. 7). The conversion allows the wheels to move up past the vehicle's sides, and the limitation of suspension movement caused by the presence of the body or cargo-bed is obviated. With this system, relatively long off-road suspension movements of about 30 to 50 inches are made possible, enabling reduced vertical accelerations on the vehicle and occupants, while traversing severe terrain at speeds difficult for vehicles with conventional suspension systems. It also permits the use of low or near constant spring force over a large part of the suspension. At the same time, the increased track width 14 significantly reduces any tendency for lateral instability (e.g., rolling). Further, the vehicle's body may be lowered between the wheels to enhance stability and/or reduce visual, thermal and radar signatures (e.g., improve stealth operation).

There are further advantages to being able to lower the body of a vehicle closer to the ground. For example, near ground level access for personnel transport can be provided without significantly compromising mobility. In addition, a heavy recoil weapon, such as a howitzer, may be used as a weapons module. The hull of vehicle 10 can be set down in contact with the ground to give the necessary stability and recoil reaction. Within a few seconds of deploying the weapon, vehicle 10 can rise and move to another location, depriving the enemy of any usable fix on the deployment signature. Further, lowering the body of the vehicle allows for a greater ease of handling modules. Because of the reduced attachment deck height, automatic self loading and unloading of modules of logistical or weapons types is achieved with inherently simpler and lighter systems than current practice dictates.

According to an exemplary embodiment, vehicle 10 comprises a vehicle hull or body, a control or suspension system coupled to vehicle body, and a plurality of wheels 16 coupled to the suspension system. Wheels 16 comprise at least one pair of wheels and each wheel 16 of each pair is located on opposite sides of vehicle 10. The suspension system comprises a changeable wheel track width for each pair of wheels 16. The wheel track width is changeable between a narrow wheel track width setting 12 (see FIG. 6) and a wide wheel track width setting 14 (see FIG. 7) by pivoting a suspension link 18 about a vertical axis.

Vehicle 10 comprises a vehicle driver cab that is vertically displaceable and has at least one raised position and at least one lowered position. Vehicle 10 comprises a motor 50 dedicated to each wheel 16 and used to drive the respective wheel. The motor 50 can be, for example, an electric motor or a hydrostatic motor. It is also contemplated the motor can be coupled to a shaft extending in the suspension arm 18 and to an end assembly coupled to a wheel 16. The motor 50 can also be mounted on the vehicle body and coupled to the wheel 16 with an appropriate linkage, for example shaft, differential and transmission. The body is configured to be lowered between the wheels 16 on opposite sides of vehicle 10 when wheels 16 are in the wide track width setting 14.

According to an exemplary embodiment, a suspension system is provided coupled to wheels 16. The system is configured to enable the changeable wheel track width for each pair of wheels 16. The narrow wheel track width setting 12 is intended to comply with road, rail, sea and air transportation requirements. The narrow wheel track width setting 12 is configured so that wheels 16 are able to travel a first suspended vertical distance 44 (see FIG. 6). The wide wheel track width setting 14 is configured so that wheels 16 extend outward to at least partially clear a vehicle body thereby permitting wheels 16 to travel a second suspended vertical distance 46 (see FIG. 7). According to an exemplary embodiment, the second suspended vertical distance 46 is greater than the first suspended vertical distance 44.

According to various exemplary embodiments, wheels 16 may be independently steered by hydraulic, electrical and/or pneumatic actuators controlled by signals from one or more processor. A first transducer and/or sensor may be used to determine the steering position of a steered wheel. The first transducer and/or sensor comprises an analog device which is automatically calibrated by a second transducer and/or sensor which sends a pulse signal when the steered wheel passes a predetermined steering angle. The first transducer and/or sensor is calibrated to verify signal integrity and correct for signal drift.

Figure 8:
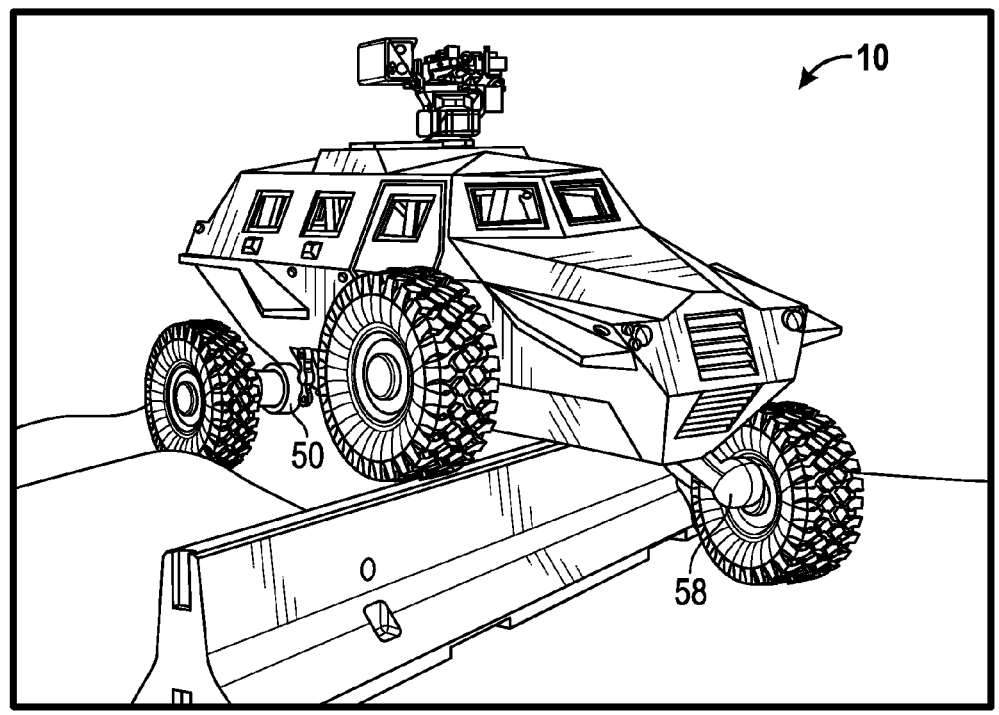
FIG. 8 is an illustration of a 4-wheel vehicle including an exemplary embodiment of a suspension system including an electric motor and gear drive mounted on a suspension arm.
Figure 9:
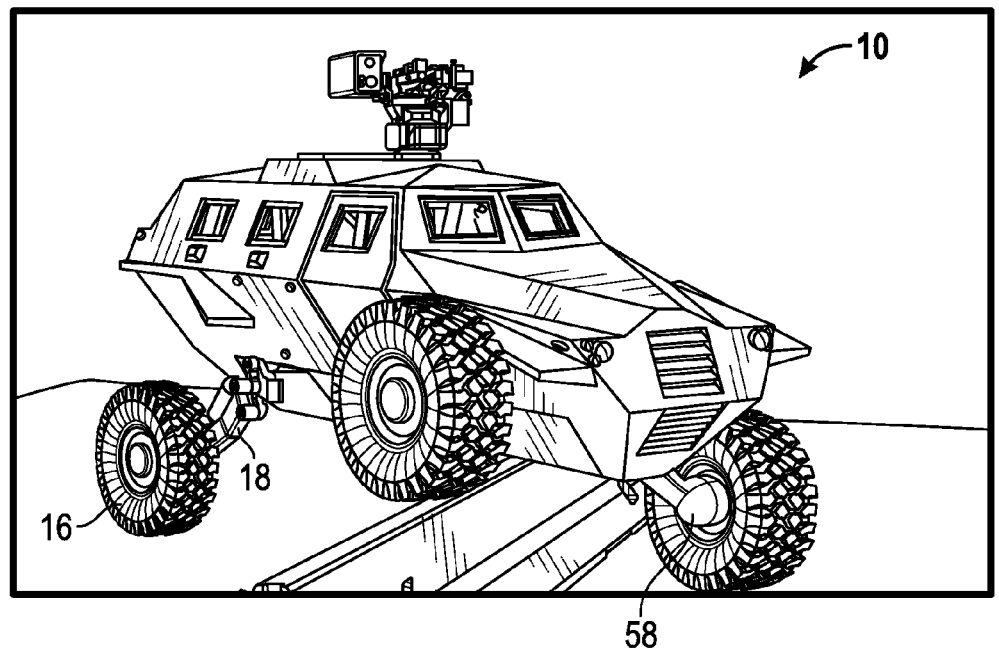
FIG. 9 is an illustration of a 4-wheel vehicle including an exemplary embodiment of a suspension system coupled to each wheel and the vehicle body.
Figure 10:
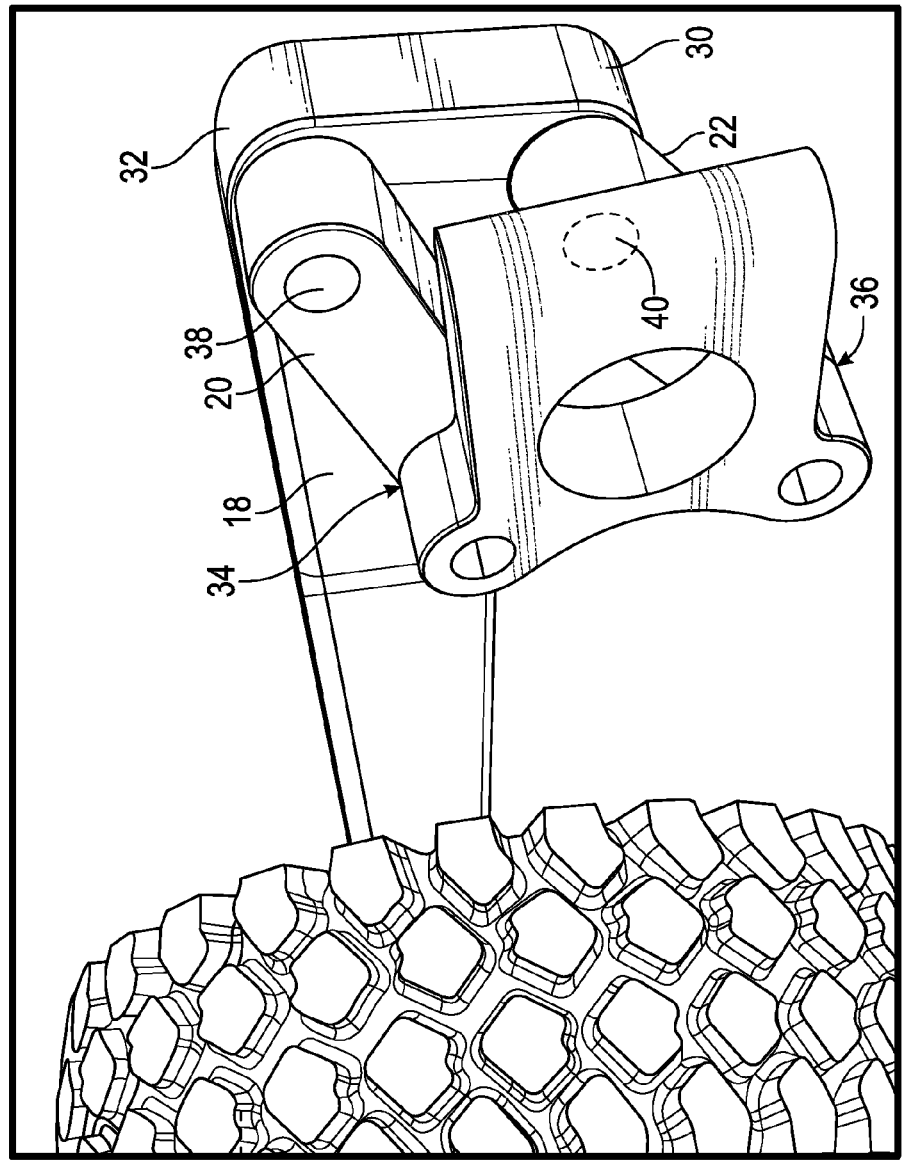
FIG. 10 is a perspective illustration of a suspension system configured for movement of an attached wheel about a vertical axis from one of a narrow wheel track width and a wide wheel track wheel width.

According to an exemplary embodiment, the suspension system comprises a motor dedicated to each wheel 16 and utilized to drive each respective wheel. Each wheel 16 is partially covered by a housing which moves with each wheel and is configured to reduce visual, radar and thermal signatures of the wheels. The wheel 16 may be coupled to the suspension arm 18 with an assembly 58, for example a planetary reduction drive. The assembly 58 may include a motor 50 coupled to wheel 16. (See FIGS. 8 and 9). The suspension link 18, which may comprise a trailing arm or a leading arm, is configured to attach to a vehicle 10 by pivoting about an axis which moves with suspension vertical displacement so that spurious vertical force resultant from wheel tractive force and angular arm position relative to the ground plane is minimized. The suspension link 18 is configured to be constrained in motion by other links (e.g., similar to a "McPhearson strut" or "semi-trailing" link).

According to an exemplary embodiment, the changeable wheel track width is held in the narrow wheel track width setting 12 and the wide wheel track width setting 14 by links 18 driven by actuators. According to an exemplary embodiment, the changeable wheel track width is held in the narrow wheel width setting 12 and the wide wheel track width setting 14 by actuators moving links 18 directly. The mechanical lock mechanisms are used to lock links 18 in narrow wheel track width setting 12 and wide wheel track width setting 14. The force utilized to change the wheel track width is reduced by a combined use of a wheel steering mechanism and forward motion of the vehicle so that during a track widening change the wheel steering mechanism aligns wheels 16 outward and during a track narrowing change the wheel steering mechanism aligns wheels 16 inward.

According to an exemplary embodiment, vehicle 10 includes a payload that forms part of a stressed structure of the vehicle. The payload comprises an ISO container which is modular and attached to the vehicle with container ISO-locks incorporated in the vehicle body. The payload may be a cargo bed module for transportation of cargo and the cargo bed module may comprise ISO-locks for attachment of a container module.

According to an exemplary embodiment, vehicle 10 comprises a cab module with a standardized mechanical and electrical mounting interface with the vehicle, the cab module being configured to provide different cab arrangements. According to an exemplary embodiment, the cab module may be configured for amphibious operation in a floating displacement hull mode by setting cab height relative to the vehicle. Ground clearance for the cab module is configured by setting cab height relative to the vehicle such that a forward lower part of the vehicle body immediately aft of a rear lower edge of the cab module forms a bluff step to reduce induced rearward velocity of air under the vehicle.

According to an exemplary embodiment, vehicle 10 includes applications for amphibious operation by being able to raise its wheels sufficiently high to expose the vehicle's underbody to the surface of a body of water. According to a first exemplary embodiment, amphibious operation occurs where vehicle 10 raises wheels 16 to an intermediate level so that the floating hull becomes stabilized laterally by the partially immersed wheels acting as powered, steering and buoyant outriggers. According to a second exemplary embodiment, vehicle 10 raises wheels 16 sufficiently to clear the water and uses a planing hull utilizing a marine drive system and a vehicle power to weight ratio in excess of about 60 brake horsepower (bhp) per ton.

According to an exemplary embodiment, vehicle 10 comprises a rear hull module that houses a marine propulsion system and a dedicated electronic circuit, motor, cooling device, lubricating fluid, ducting, electrical power controller, transducer, processor, and/or associated software for interfacing with a central control system. The marine propulsion system comprises a stern drive propeller and/or hydrodynamic water jet thruster. Vehicle 10 comprises an electrical generating device comprising an internal combustion engine, a turbine driving an electrical generator, and/or a fuel cell. The electrical generating device is housed in a power module for providing electrical power to the wheel module and marine propulsion system to enable locomotion of the vehicle.

According to an exemplary embodiment, vehicle 10 comprises a wheel module that can include a wheel 16, an associated suspension assembly element (e.g., link 18), an associated wheel drive element, an associated wheel braking element, an associated wheel steering element, and/or an associated central tire inflation element. In addition, the wheel module may comprise an electronic circuit, a cooling device, a lubricating fluid, power fluid, ducting, an electrical power controller, transducer, processor, and/or associated software interfacing with a central control system. One or more of suspension operation, steering operation, braking operation, central tire inflation, and driver operation can be controlled by signals from a common processing center.

In general, off-road rough terrain vehicles fall into two primary categories including wheeled and tracked. While the general level of mobility of both categories may overlap and compare favorably with each other across a wide range of mobility scenarios, each methodology has various advantages and disadvantages for different vehicle applications.

Tracked vehicles can spread their weight over a large ground contact area, so generally fare more favorably in soft slippery conditions and are usually a preferred choice for heavy armored vehicles. Comparable wheeled vehicles have large wheels and light wheel loadings, with tires set to low pressure operation by means of a central tire inflation system (CTI). Further, heavily armored tracked vehicles, such as tanks, are able to force a path through foliage and lightly wooded areas whereas lighter vehicles are not always able to do this.

For sustained high-speed travel over paved roads and trails, the wheeled vehicle's capability exceeds that of conventional tracked vehicle designs, in both speed and maintainability. By not having a restriction placed on it by the presence of the tracks themselves, the wheeled vehicle has a greater potential to achieve the design goal of a long suspension travel, both in absolute terms and also differentially between adjacent wheels on the same side of the vehicle.

The exemplary vehicle enhances the mobility of light and medium weight wheeled vehicles so that they outperform most other conventional military vehicles in both terms of sustainable speed, not only over paved roads and trails, but also over a broad spectrum of rough off-road terrains as well as soft slippery terrain. High vertical accelerations imposed on the unsprung masses of the wheels of conventional vehicles while traversing rough terrain at high speeds can prematurely limit the potential of the vehicle, if all measures are not taken to reduce the unsprung wheel masses. This is because at these high speeds the vertical inertia component of the wheel mass, which is reacted by the suspension spring rebound force, may prematurely result in an excessive loss of tire contact with the ground when traversing rough terrain. Because conventional vehicles are generally not designed to be fast enough to be impeded by these tire/ground contact limits, unsprung mass is not as important as it is at higher speeds. Therefore, conventional vehicles not only incur the unsprung weight penalty of wheel mounted brakes, but often have heavy reduction drive gearboxes built into their wheels.

Conventional tires are designed to carry higher loads than required for high mobility. A 53-inch diameter 16R20 military tire weighs about 330 pounds, and is typically rated at a load capacity of about 14,500 pounds per tire. Yet on a high mobility vehicle, such a tire is unlikely to be loaded in excess of 7,500 pounds if the light ground contact pressures needed for the mobility targets are maintained. At the same time, such tires are also speed limited at different tire pressure/deflection cases, due to heat generation associated with hysteresis in the thickness of the tire carcass. Accordingly, dedicated tires developed for the high mobility applications provide for a reduction in unsprung mass and an increase in allowable tire operating speed.

Vulnerability to tire damage, whether by simple puncture during normal use or by enemy action, is a potential weakness of pneumatic tired wheels for military use. With development, and the latest fiber technologies, this vulnerability is reduced. CTI systems can detect and maintain tire pressure against small leaks and, on a multi-wheeled vehicle, any one tire damaged beyond the CTI's auto-inflation capability is retracted from use automatically. Run-flat tires, which rely on a greased solid rubber tire mounted on the wheel rim inside the air-space of the outer pneumatic tire, have the disadvantage of adding to the vehicle's unsprung mass. In the case of a 16R20 tire, this amounts to about 200 pounds per wheel. Therefore, according to a preferred embodiment in the case of a high mobility vehicle, a solution is to employ a rubberized aramid or other advanced fiber inner-bag, more or less in the form of an inner-tube, "vacuumed flat" into a protective recess in the wheel rim within the airspace of the tire. The CTI system then incorporates a "diverter valve" at the wheel, triggered by local telemetric communication or by a distinctive pneumatic pulse sent down the individual tire's inflation line, to inflate the emergency inner bag. Being reinforced and non-elastic, such a bag has the potential to bridge even relatively severe tire damage, such as that inflected by machine gun fire.

Vehicle 10 can incorporate additional design considerations for rapid deployment stealth vehicles. For example, noise signature, thermal signature, nuclear, biological and chemical (NBC) protection, electromagnetic pulse (EMP) protection, radio frequency interference (RFI), and armor protection are technologies associated with enclosure design. In addition, lightweight construction is achieved by directing the stress path around the outermost fibers of a structure— another criteria associated with enclosed stressed shell construction.

Within this enclosed environment, the design and management of cooling flows, both ventilated (NBC contaminatable) for primary cooling, and refrigerated or conditioned for non-contaminatable areas such as for personnel and processing equipment, are applicable. Similarly, the protection and screening of the subsystem electronic communication channels are applicable.

The use of individual electric wheel drives frees the design from limitations of conventional propeller and axle shaft drive systems. The prime mover may be a conventional power unit, internal combustion or turbine, driving a generator, a fuel cell, and/or other system. Individual electric wheel drive motors may include a fixed ratio gearing or at least a two step ratio change drive to their respective wheels. This is because the extremely high wheel torques encountered by military vehicles over cross-country terrain, especially when hauling unpowered trailers, are likely to use larger (diameter), heavier and more costly motors on a fixed ratio drive than on a multi ratio drive. Further, larger diameter motors are often more limited with respect to a maximum allowable speed due to centrifugal limitations on their armatures or rotors. To determine whether an electric motor is preferred, alternative configurations are compared in terms of size, weight and cost. When these parameters are more favorable in fixed ratio motor, fully meeting both the low-speed torque requirement and the high speed operating capability, then such a motor is be the preferred choice over a smaller motor combined with a simple two-ratio planetary gearbox.

The traversing of rough terrain at high speeds raises the issue of speed variations imposed on the effective inertial mass of each wheel/drive-train/motor system, caused by instantaneous differences between the linear speed of the vehicle and the true speed at the tire contact point. That is, while vehicle 10 may travel at high continuous speed cross-country, the tires follow the terrain travel at independent and constantly varying speeds. Thus, according to an exemplary embodiment, constant angular wheel accelerations are reacted against the rotational inertia of the wheel and drive system. Because the drive motor is geared to run at higher rotational speeds than the wheel itself, its effective rotational inertia can in some instances be very high resulting in longitudinal reactions on the vehicle/occupants, dynamic wheel-slippage, and/or significant electrical drive motor surges. To overcome such problems, an acceptable level of damped torsional compliance can be designed into the drive system, or some level of longitudinal compliance can be designed into the wheel suspension system. Other techniques such as electrical power cross-feed, feeding instantaneous power from decelerating wheel drives into instantaneously accelerating wheel drives via a small capacitance bank can also be applied. Such systems can use direct torque sensing at, or close to the wheel, to cut drive inertia out of the equation.

Trailing arm suspension systems are relevant to the attainment of large vertical suspension displacements because they can achieve the necessary length of wheel travel without "eating into" the width of vehicle's hull or understructure as significantly as a more conventional lateral control arm suspension. Trailing-arm systems are commonly employed on tanks and other tracked vehicles. However there is a difference between the applications. Tank tracks are typically sprocket-driven from a fixed (unsprung) axle-drive, while the leading or trailing arm support wheels, which bear the tank's weight along the track length, are not driven. In the case of a wheel-driven vehicle using trailing or leading-arm suspension, full consideration is given to containment or elimination of both the effects of drive and brake torque reactions, as well as moments generated about the suspension pivotal axes by the longitudinal drive thrust and braking forces. Such reactions are capable of generating spurious vertical force components, which may be detrimental to the correct operation of the suspension system, especially with respect to Near Constant Force (NCF) springing.

Spurious vertical forces may be generated as a result of two distinct physical reasons. First, if the torque reaction of a driven axle or wheel brakes are reacted into a simple leading or trailing arm system, the moments to the same value about the arm pivot will be applied. These moments will be reacted at the suspension spring element, giving rise to a vertical force. This force will be upwards for a driving torque and downwards for braking on a trailing arm system. Respective force directions will be reversed for leading arm systems.

Second, if the arm (e.g., link 18) is not aligned with the horizontal longitudinal plane of the vehicle, then longitudinal driving or braking thrust forces (tractive forces) imparted to the suspension arms, will give rise to vertical force components proportional to the longitudinal thrust multiplied by the tangent of the angle of deviation of the arms to the plane.

While the addition of a parallel anti-torque link can eliminate spurious vertical forces caused by wheel torque, it does not necessarily eliminate the forces caused by tractive force. This can be a limitation of conventional leading or trailing arm design, whether corrected for torque reaction or not, and is a natural consequence of the locus of the wheel center following an arc about the arm pivot.

The tangent of the angle of deviation of the suspension arms from the longitudinal horizontal plane of the vehicle is the same as the ratio of opposite to adjacent sides of a right triangle whose hypotenuse is a line between the wheel center position when the suspension arm is horizontal and the wheel center in any other position. Accordingly, there can be an insignificant vertical thrust generated if the adjacent side of the triangle has length of zero. With a conventional leading or trailing arm, this can typically only occur if the arm has substantially long (e.g., infinite) length relative to the vertical travel.

Referring to FIGS. 4, 10, 11 and 12, one embodiment of a suspension system generates a substantially similar effect as an infinite leading or trailing arm length of conventional systems by means of two links 20, 22 interposed between arm 18 and the vehicle's sprung mass, instead of a single pivotal bearing. Link arm 18 is shown as having a pair of pivot points 30, 32 that rotatably couple with pivot points 38, 40 located on links 20, 22, respectively. Links 20, 22 then have second pivot points 34, 36, respectively, that then couple to the vehicle primary mass and are pivotable around a vertical axis so as to provide for the changeable wheel track width setting. By arranging the arm 18 and links 20, 22 in a nominal mid suspension travel position, the wheel center 26 is constrained to follow an essentially linear vertical locus 24 from full rebound to full jounce.

Vertical force components of the tractive forces generated by the vehicle drive system or vehicle braking system and reacted upon by the suspension arm 18 are not transmitted to the sprung mass (vehicle body) through pivot points 34 and 36 of the suspension system. According to an exemplary embodiment, no significant combined spurious vertical forces are generated at the links 20, 22 attachment to the sprung mass of vehicle 10.

Figure 12:
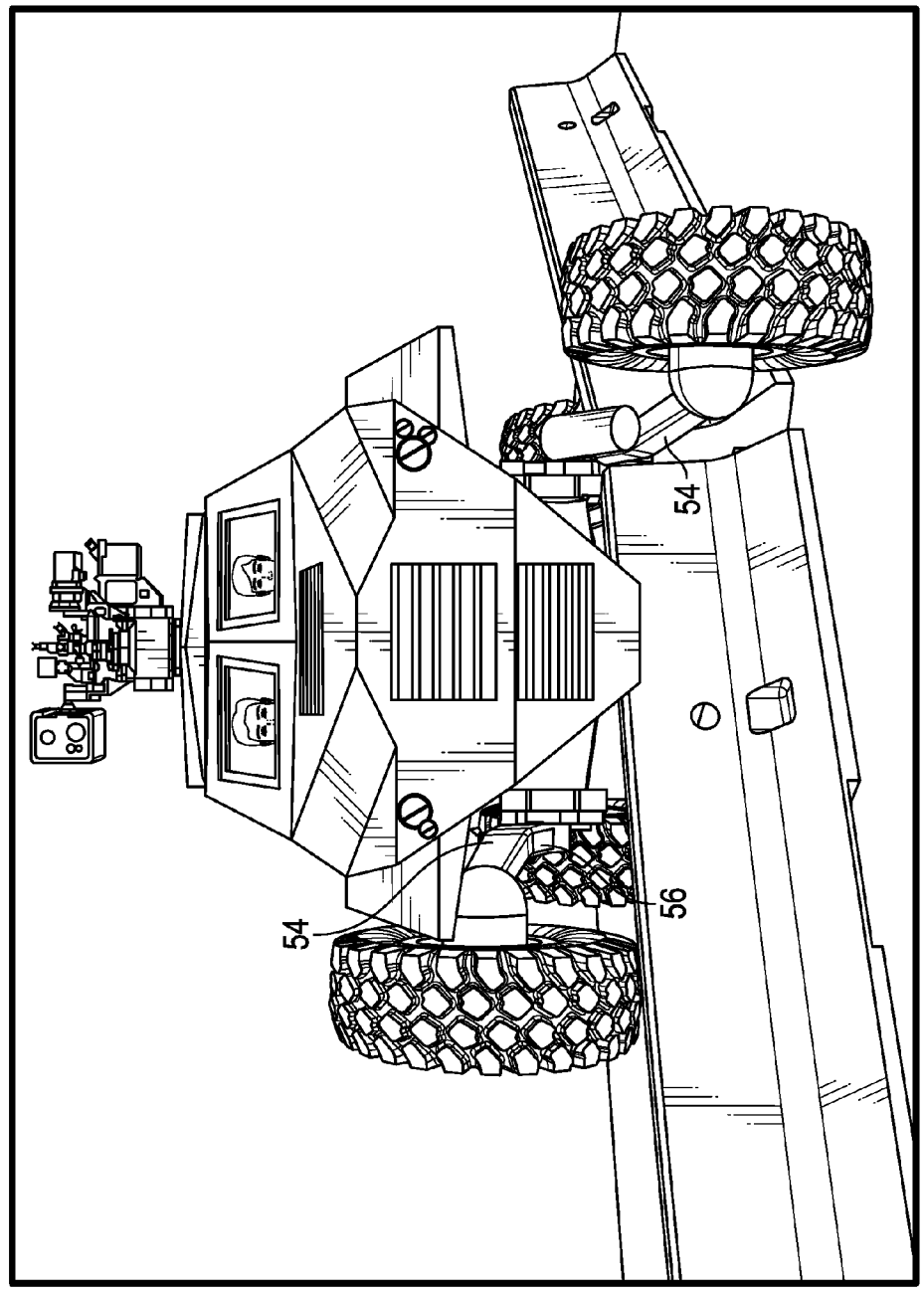
FIG. 12 is an illustration of an exemplary embodiment of a 4-wheel vehicle having an angled suspension arm positioned in a wide wheel track width.
Figure 13:
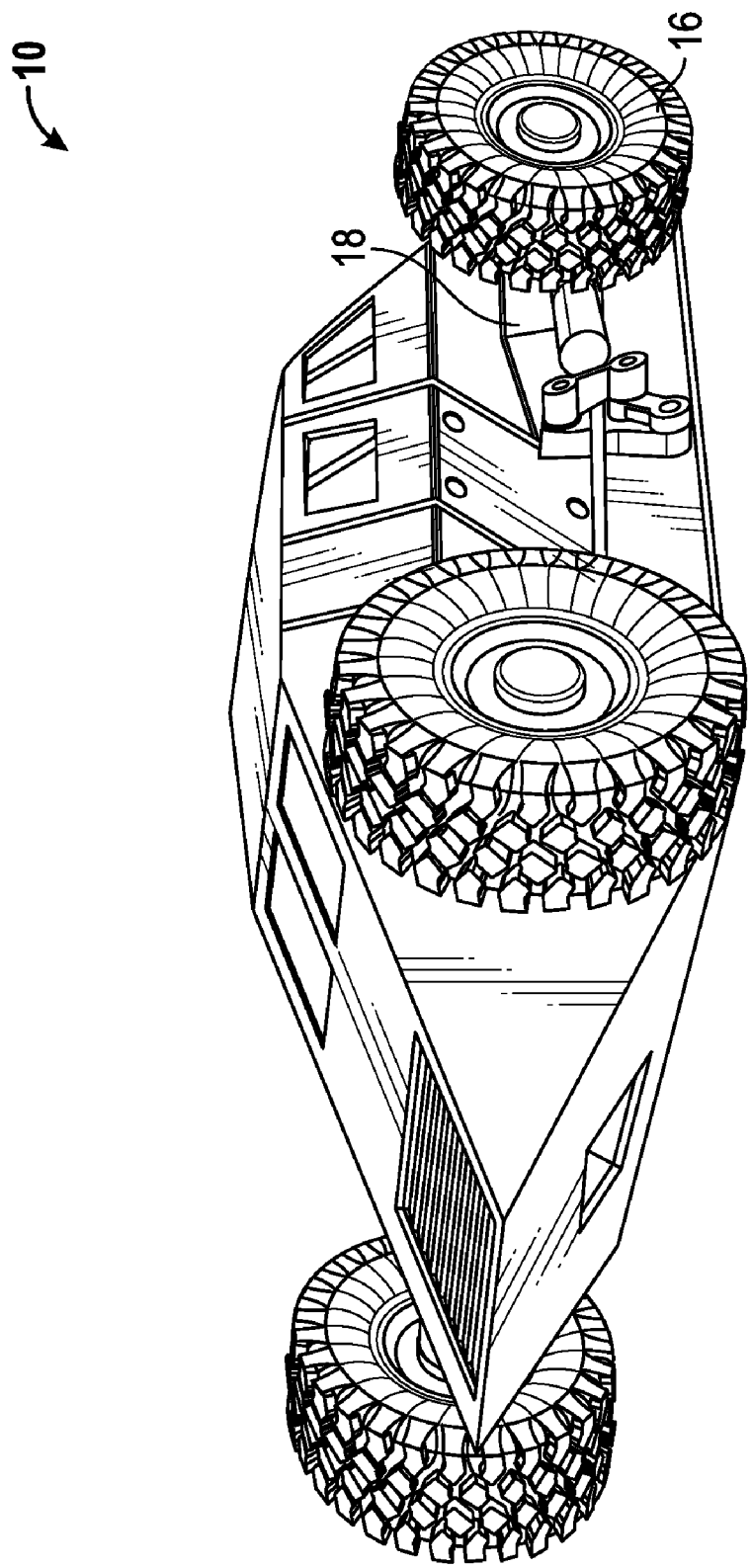
FIG. 13 is an illustration of an exemplary embodiment of a 4-wheel vehicle having an angled suspension arm in a narrow wheel track width.

In an exemplary embodiment, the suspension arm 18 includes an angled portion 54, for example, 30° relative to the unangled portion 56 (hereinafter referred to as the morph angle) (See FIG. 12). The advantage of the angled suspension arm is to provide a near linear vertical locus of travel of the wheel 16 when the wheel is in the wide wheel track width 14 configuration. According to an exemplary embodiment, there is no specific requirement for symmetry about the horizontal or vertical axes of either the components or pivotal attachments on the suspension arm 18 or vehicle sprung mass. In addition, there is not a requirement for the link arms 20, 22 to be of equal length. Of course, one skilled in the art can appreciate the above system is merely exemplary and any number of suitable configurations may be utilized.

Figure 11:
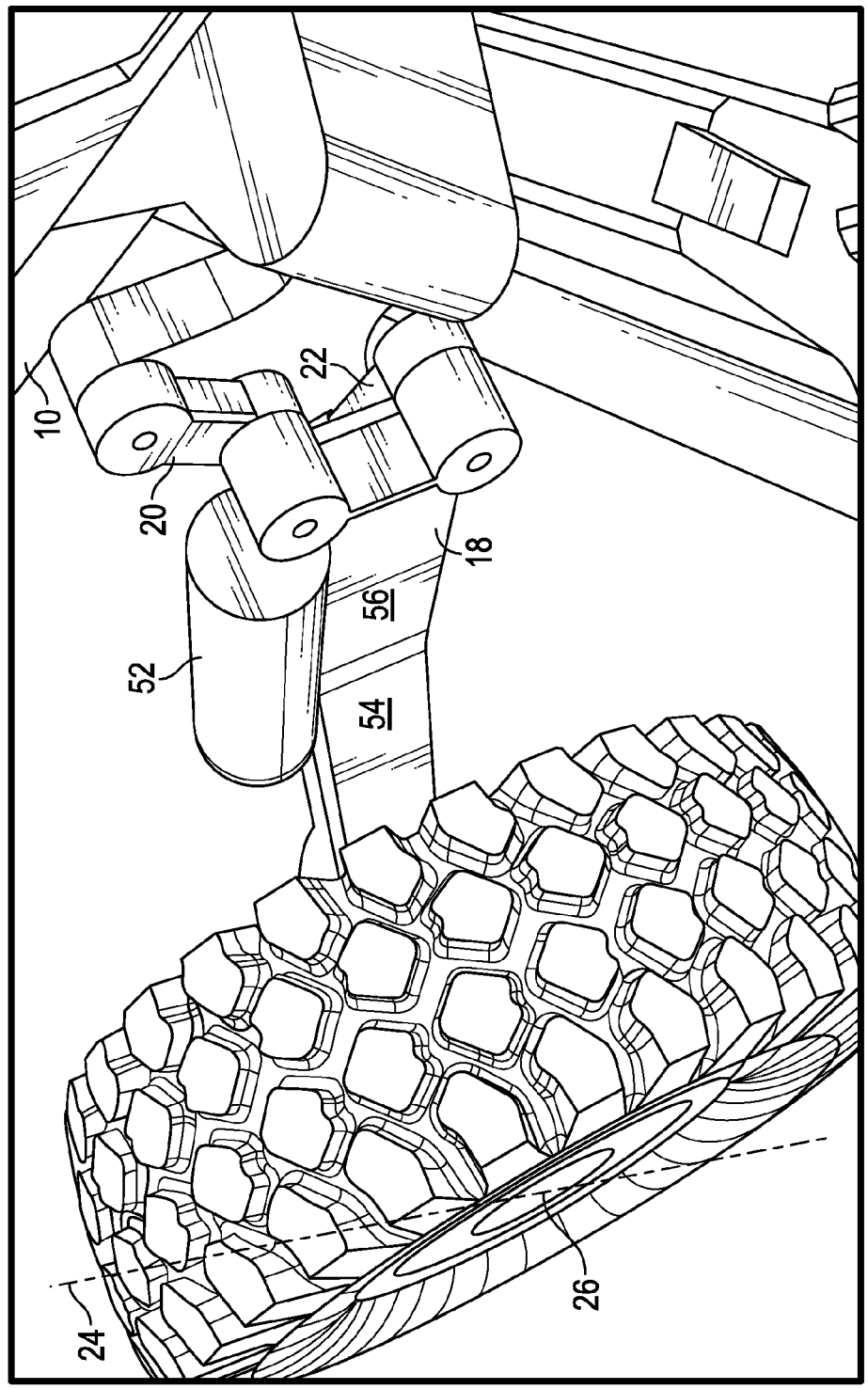
FIG. 11 is an illustration of an exemplary embodiment of a suspension system couple to a vehicle wheel and having a near constant force strut.

Referring to FIG. 11, according to an exemplary embodiment, a near constant force strut 52 may be provided with suspension arm 18. Strut 52 may be coupled via lever arms extending from the wheel-side of suspension arm 18 and one of links 20, 22. Strut 52 may be located either above (if coupled to link 20) or below (if coupled to link 22) the suspension arm 18.

According to an exemplary embodiment, a near constant force, near isothermal gas spring may be used with vehicle 10. A compact, automatically leveling, high-pressure gas spring having the capability of providing a near constant force to a trailing or leading arm suspension system over a large vertical suspension travel (up to 50 inches) may be provided. Highly nonlinear adiabatic gas expansion and compression behavior is at least minimized by using a high thermal conductivity metal mesh, sinter or corrugated coil filling within the entrapped gas volume. By doing this, the highly nonlinear dynamic adiabatic temperature changes within the pressurized gas volume are at least reduced by virtue of the heat transfer between the gas and metal filling. The effect is to reduce the gas characteristics to near isothermal behavior, which, for example, can cut the pressure rise for a given volumetric compression value almost in half. The remaining non-constant-force isothermal-like gas behavior is then made to function as near-constant-force by arranging the connecting link mechanism to give a changing mechanical advantage to correct the force applied to the suspension movement to the desired near-constant-force behavior. A feature of this approach is the use of a simple, compact, diaphragm pump which has a direct hydraulic fluid/gas interface directly across the diaphragm, to fulfill the self-leveling function. This eliminates the weight, cost and packaging bulk of multiple high-pressure accumulators.

According to an exemplary embodiment, antiphased tuned mass damping (see FIG. 5), also known as tuned mass damping (TMD) or inertia damping, may be used in vibration mitigation. For example, a TMD cylinder 28 may include a relatively small mass (between 1-7% of the primary mass) that is set on one or more spring elements (not shown) and arranged to vibrate at, or close to the natural frequency of primary mass (e.g., the wheel, tire, suspension system, etc.), shown as vehicle wheel assembly 42, to be damped. The small tuned mass is lightly damped against the primary mass which causes it to vibrate out of phase with the primary mass and, oftentimes, at an amplitude of vibration greater than the primary mass. Accordingly, the forces from the small tuned mass tend to cancel the vibration of the primary mass. This feature can be utilized to limit the amplitude of the "wheel bounce" frequencies of the unsprung masses of off road vehicle wheel assemblies (e.g., where a long travel near constant force suspension and active control system such as where Active Suspension by Timed Intermittent Connectivity (ASTIC) are used).

The wheel (bounce) damping function, can be addressed in several ways. For example, conventional damping techniques within the strut or via a conventional damper may be used. In addition, damping wheel-hop by driving the strut servo valves via algorithms which recognize the wheel-mass/tire natural frequency for any given CTI setting may be used. According to a preferred embodiment, the technique of anti-phased tuned mass damping, which draws on the principles successfully employed in the damping of the natural frequency oscillations of skyscraper buildings may be utilized.

The problem with attempting some conventional damping systems with military vehicles is that the Central Tire Inflation (CTI) system is used to vary tire pressures significantly in operation. This changes the natural frequency of the unsprung masses. To overcome this limitation, small air springs may be used to constrain the tuned mass, inflated to the same pressure as the tires by the CTI system. This would tend to automatically match the natural frequencies of the systems with tire pressure changes.

According to an exemplary embodiment, a "tuned impact damper" may be used. This is similar to the tuned mass damper, but the mass is free to hammer between two resilient stops. This system has similarities to systems employed on high-rise buildings and obtains similar results with a smaller tuned mass.

ASTIC is a low stability "sprung" mass control system, which is similar to the zero or negative stability systems used for fighter aircraft control (e.g., X29). Low stability is deliberately achieved by employing near constant force support elements in each wheel suspension instead of springs. Correction of the "sprung" mass (also referred to as the primary mass) to maintain desired ride-height and angular positions in pitch and roll is achieved by using corrective forces derived from the energy captured as the vehicle traverses rough or undulating ground surfaces. This greatly enhances suspension capability without requiring additional vehicle power, and is of importance to overall fuel efficiency of the vehicle.

Computing the corrective forces and moments and applying a controlling strategy permits one or more chosen strut to be partially or completely locked. Releasing or locking a strut is timed such that the measured force, over and above the near constant force (NCF) value, is applied for a real-time computed duration suitable to achieve the corrective action. In this way, locking the suspension captures energy moving the primary mass in the desired direction. Unlocking the suspension decouples energy moving the primary mass an undesired direction.

Having completed a control cycle, the primary mass will closely approximate the targeted set-point values. A new corrective cycle will repeat the process thus achieving active suspension control. In operation, this suspension control provides improved ride quality, even for changing load and terrain conditions. In addition, the primary mass pitch, roll and ride height can adjusted to optimize mission requirements, "Drive by Wire or Light" (DWL) adds a dimension to military vehicle design. A DWL system functions by using a computer or processor to interpret the operator's commands and control the vehicle's subsystems by means of digital signals communicated along wires or optical fiber leads. For example, a steering input from the driver may be processed, using specially written software, to provide separate signals to servo-motors or actuators at each wheel, changing the steering angle of each wheel individually to effect a properly executed turn. According to an exemplary embodiment, there is no mechanical linkage between the wheels, there is no compromising physical limitation on the steering angle relationship between individual wheels. Accordingly, different optimal steering angle relationships may be defined by the computer, depending on the vehicle's speed, payload configuration and terrain surface conditions. In some circumstances, such as tight turns in slippery conditions, the controlling algorithms can elect to vary wheel drive torque between wheels on opposite sides of the vehicle to help execute the driver's commands.

As discussed above, with respect to DWL systems, reliability of operation for multiple individually steered wheels is achieved using automatically-calibrating analog wheel steering angle sensors. This technique comprises a highly reliable analog angular position sensor using, for example, a strain-gauged element operating well below its endurance limit. Continuous calibration of the sensor to prevent drift is accomplished using a second simple pulse sensor at the steered wheel, such as a Hall effect sensor, to trigger at the "dead ahead" position. The pulse, which is transmitted from each of the steered wheels every time the dead ahead position is crossed, is used to recalibrate that wheel's steering sensor's output. Since this happens many times a minute in normal use, wheel alignment of multiple wheel systems is accomplished. This technique also fulfils the role of double redundancy in the steering signal communication, while at the same time permitting the use of inexpensive, but highly reliable, analog positioning transducers with the precision of an encoder. According to an exemplary embodiment, the system is configured so that if a wheel steering sensor or actuator malfunction, the error is detected, the driver warned, and the affected wheel lifted out of use.

According to various alternative embodiments, DWL may be applied to a variety of other vehicle control parameters such as active suspension, steering, wheel drive torque, central tire inflation (CTI) pressure, wheel slip control, braking etc. According to an exemplary embodiment, the weapons systems may be integrated with the vehicle control systems.

DWL is an "enabling technology" for modularization. It provides a "plug and play" dimension to vehicle design. Under this regime, it is possible to place the same steered, driven, braked, actively suspended, CTI equipped and track changing lower-hull/axle modules where needed for a particular vehicle application, without having to "design" and manufacture the connecting infrastructure. A software change enables a plurality of changes to be made for the axle modules in order to function as an individual optimally designed vehicle. Thus, a complete family of vehicles, including a 4×4 light logistics truck, a 6×6 medium truck, fighting vehicles, 8×8 or 10×10 heavyweights, and an associated range of powered trailers, can be produced from a single lower-hull/axle module design. The complete vehicle lower-hull is formed from an assembly of axle modules and matching "spacer" modules connected together such that the axle loads are suitably distributed. The prime-mover/generator module and cooling modules form part of the upper-hull. This modularity provides practical vehicle manufacturability, increased capital and lowered operating cost, as well as improved operational serviceability.

Versatility for a particular vehicle configuration is reached by further taking a modular approach to the cab and payload attachment to the basic vehicle's lower-hull. For logistics applications, the empty vehicle weight can be minimized by not having a cargo-bed as part of the vehicle itself. Instead, the lower-hull is fitted with special pre-tensioning container ISO-locks, such that a full-length container. When carried, this forms part of the vehicle's stressed structure. With a dedicated 20-foot container vehicle for example, the action of omitting the cargo bed alone yields in excess of 3,500 pounds of extra usable cargo capacity. Lower-hull structural savings further increase the payload capacity. Thus, when the vehicle is carrying a load its combined structure is stressed to react correctly, and when it is not carrying a load it does not utilize the same structural strength. With loose cargo, the cargo bed itself locks down to the lower-hull's ISO-locks to form a combined stressed structure capable of reacting the full imposed loads. With alternate mixed cargos of full-length or two or three part length containers, or loose payloads, the stressed cargo bed remains in place and the containers lock to the cargo-bed.

Essentially the same lower hull, prime-mover/generator and cooling modules form the base of the combat-vehicle variants. The modular combat vehicle payload also attaches to the lower-hull by means of the pre-tensioned ISO-lock attachments and form part of the vehicle's stressed structure. Vehicles may also be fitted with an automatic rear module self loading-unloading system. Combat vehicles may utilize a wide diversity of modules, ranging from Armored Personnel modules at one end of the scale to Rocket systems and Directed Energy Weapons modules at the other end of the scale.

In concert with the modular approach to the payload, the vehicle cab mounted to the front face of the hull is also modularized and has a common interface with all vehicles. This is because the cab may comprise a number of different forms. There are several types and degrees of armor and mine-blast protection that may be used, and since weight directly impacts mobility, heavily armored cabs are preferably of a minimum size compared with the more lightly armored or unarmored varieties. Moreover, special purpose cabs may be required for use with particular weapons, equipment modules, or for amphibious operation.

It is often advantageous for off-road mobility at high speeds over rough terrain that the driver be mounted as high as possible for good forward visibility. The ability to lower the cab is useful for transportation purposes as well as minimizing visual and radar signatures. There are also several other reasons for the operator being able to select the height of the cab. For displacement amphibious operation, the cab represents a buoyant element and the shaped forward portion of the vehicle's bow. Therefore, to improve buoyancy and minimize hydrodynamic drag, the undersurfaces of the cab are aligned with the undersurfaces of the vehicle's main lower-hull. For planing amphibious operation, the design lower surfaces of the cab which form the bow of the vehicle have a bearing on the vehicle's planing power requirement and wave height capability. Accordingly, the undersurface can be aligned marginally below the main lower-hull's undersurface to form a planing step. Further, in some desert operations, a vehicle's dust trail signature can cause the vehicle to be spotted, especially from the air. Dust-trail signatures can be minimized by using a forward undersurface air-dam such as exposing the bluff forward edge of the lower-hull (to act as the dam). The front and rear suspension heights are simultaneously be set to align the undersurface angle and height relative to the ground to minimize dust disturbance and pick-up. Further, a cab which can be lowered at will, especially on-the-fly, extends the field of fire of rear module mounted weapons systems over the top of the cab to cover the critical area forward of the vehicle's direction of travel.

According to various exemplary embodiments, the assemblies and components of the vehicle and systems may be constructed from various different materials. According to a preferred embodiment, the assemblies and components of the vehicle are constructed from materials that are durable such as metal, alloys, steel, composites, and/or any other suitable materials. In addition, various parts of the vehicle and systems may be constructed and assembled as a single integrally formed piece or may be assembled and constructed from multiple parts.

It is important to note that the above-described embodiments are illustrative only. Although the invention has been described in conjunction with specific embodiments thereof, those skilled in the art will appreciate that numerous modifications are possible without materially departing from the novel teachings and advantages of the subject matter described herein. For example, different types of vehicles may be used with the systems described herein. In addition, any suitable number of wheels and/or pairs of wheels may be used (e.g., one, three, five, etc.). Accordingly, these and all other such modifications are intended to be included within the scope of the present invention as defined in the appended claims. The order or sequence of any process or method steps may be varied or re-sequenced according to alternative embodiments. In the claims, any means-plus-function clause is intended to cover the structures described herein as performing the recited function and not only structural equivalents but also equivalent structures. Other substitutions, modifications, changes and omissions may be made in the design, operating conditions and arrangements of the preferred and other exemplary embodiments without departing from the spirit of the present invention.

For purposes of this disclosure, the term "coupled" means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components or the two components and any additional member being attached to one another. Such joining may be permanent in nature or alternatively may be removable or releasable in nature.

What is claimed is:

1. A suspension system for a vehicle having a body, comprising:
    a plurality of wheels coupled to the vehicle and comprising at least one pair of wheels, each wheel of the at least one pair of wheels positionable on opposite sides of the vehicle wherein at least one wheel is driven by a motor;
    a changeable wheel track width for the at least one pair of wheels;
        wherein the changeable wheel track width comprises at least a narrow wheel track width setting and a wide wheel track width setting; and
        wherein the wheel track width is changeable between the narrow wheel track width setting and the wide wheel track width setting by pivoting a suspension link about a vertical axis;
    a suspension arm comprising a first end and a second end;
    a wheel attached at the first end of the arm by an assembly;
    at least two links each comprising a first and second end having pivotable bearings at each end, the second ends of the at least two links coupled to the second end of the suspension arm;
        wherein the first ends of the at least two links are configured to couple to a sprung mass of the vehicle; and
        wherein a locus of a center of the wheels is constrained to a substantially vertical linear path over a range of suspension travel; and
    a strut having first end coupled to the suspension arm and a second end coupled to one of the links.

2. The system of claim 1, wherein the narrow wheel track width setting is configured so that the wheels are able to travel a first suspended vertical distance.

3. The system of claim 2, wherein the wide wheel track width setting is configured so that the wheels extend to at least partially clear the vehicle body to permit the wheels to travel a second suspended vertical distance.

4. The system of claim 3, wherein the second suspended vertical distance is greater than the first suspended vertical distance.

5. The system of claim 1, wherein the suspension link is at least one of a trailing and leading suspension arm.

6. The system of claim 1, wherein the suspension link is configured to attach to the vehicle by pivoting about an axis which moves with suspension vertical displacement so that spurious vertical force resultant from wheel tractive force and angular arm position relative to the ground plane is minimized.

7. The system of claim 6, wherein the suspension link is configured to be constrained in motion.

8. The system of claim 1, wherein the changeable wheel track width is held in the narrow wheel track width setting and the wide wheel track width setting by links driven by actuators.

9. The system of claim 8, wherein the changeable wheel track width is held in the narrow wheel track width setting and the wide wheel track width setting by actuators moving the links directly, and wherein mechanical lock mechanisms are used to lock the links in the narrow wheel track width setting and the wide wheel track width setting.

10. The system of claim 9, wherein the force utilized to change wheel track width is reduced by a combined use of a wheel steering mechanism and forward motion of the vehicle, so that during a track widening change the wheel steering mechanism aligns the wheels outward and during a track narrowing change the wheel steering mechanism aligns the wheels inward.

11. The system of claim 1, wherein the strut is configured as a constant force strut.

12. The system of claim 1, wherein the assembly include a planetary reduction drive coupled to the wheel.

13. The system of claim 1, wherein each wheel is independently steerable.

14. The system of claim 1, wherein the suspension arm includes an angled portion and an unangled portion.

15. A vehicle, comprising:
a vehicle body;
a suspension system coupled to the vehicle body;
a plurality of wheels coupled to the suspension system comprising at least one pair of wheels, each wheel of the at least one pair of wheels being located on opposite sides of the vehicle wherein at least one wheel is driven by a motor;
wherein the suspension system comprises a changeable wheel track width for the at least one pair of wheels; and
wherein the wheel track width is changeable between a narrow wheel track width setting and a wide wheel track width setting by pivoting a suspension link about a vertical axis;
a suspension arm comprising a first end and a second end;
a wheel attached at the first end of the arm by an assembly;
at least two links each comprising a first and second end having pivotable bearings at each end, the second ends of the at least two links coupled to the second end of the suspension arm;
wherein the first ends of the at least two links are configured to couple to a sprung mass of the vehicle; and
wherein a locus of a center of the wheels is constrained to a substantially vertical linear path over a range of suspension travel; and
a strut having a first end coupled to the suspension arm and a second end coupled to one of the links.

16. The vehicle of claim 15, wherein the vehicle body is configured to be lowered between the wheels on opposite sides of the vehicle when the wheels are in the wide track width setting.

17. The system of claim 15, wherein the strut is configured as a constant force strut.

18. The system of claim 15, wherein the assembly includes a planetary reduction drive coupled to the wheel.

19. The system of claim 15, wherein each wheel is independently steerable.

20. The system of claim 15, wherein the suspension arm includes an angled portion and an unangled portion.

21. A system for correcting vertical forces in vehicle suspensions, comprising:
a suspension arm comprising a first end and a second end;
a wheel attached at the first end of the arm by an assembly;
at least two links each comprising a first and second end having pivotable bearings at each end, the second ends of the at least two links coupled to the second end of the suspension arm;
wherein the first ends of the at least two links are configured to couple to a sprung mass of a vehicle; and
wherein a locus of a center of the wheels is constrained to a substantially vertical linear path over a range of suspension travel; and
a strut having first end coupled to the suspension arm and a second end coupled to one of the links.

22. The system of claim 21, wherein the assembly comprises a rotatable axle shaft.

23. The system of claim 21, wherein the assembly comprises a bearing assembly.

24. The system of claim 21, wherein the strut is configured as a constant force strut.

25. The system of claim 21, wherein the assembly includes a planetary reduction drive coupled to the wheel.

26. The system of claim 21, wherein each wheel is independently steerable.

27. The system of claim 21, wherein the suspension arm includes an angled portion and an unangled portion.

* * * * *